(12) United States Patent
Ito et al.

(10) Patent No.: US 9,488,123 B2
(45) Date of Patent: Nov. 8, 2016

(54) INTERNAL COMBUSTION ENGINE DIAGNOSTIC DEVICE AND INTERNAL COMBUSTION ENGINE DIAGNOSTIC METHOD

(75) Inventors: Hiroshi Ito, Koto-ku (JP); Takayuki Abe, Saitama (JP); Masahiro Kato, Wako (JP); Tetsuya Ohno, Itabashi-ku (JP)

(73) Assignee: HONDA MOTOR CO., LTD., Tokyo (JP)

( * ) Notice: Subject to any disclaimer, the term of this patent is extended or adjusted under 35 U.S.C. 154(b) by 698 days.

(21) Appl. No.: 13/819,347

(22) PCT Filed: Aug. 10, 2011

(86) PCT No.: PCT/JP2011/068241
§ 371 (c)(1),
(2), (4) Date: Feb. 27, 2013

(87) PCT Pub. No.: WO2012/029517
PCT Pub. Date: Mar. 8, 2012

(65) Prior Publication Data
US 2013/0158841 A1    Jun. 20, 2013

(30) Foreign Application Priority Data

Sep. 3, 2010    (JP) ................. 2010-197410

(51) Int. Cl.
*F02D 41/00* (2006.01)
*F02D 41/22* (2006.01)
*F02D 41/14* (2006.01)

(52) U.S. Cl.
CPC ......... *F02D 41/22* (2013.01); *F02D 41/0085* (2013.01); *F02D 41/1456* (2013.01); *F02D 2200/1015* (2013.01); *Y02T 10/40* (2013.01)

(58) Field of Classification Search
CPC .. F02D 41/008; F02D 41/30; F02D 41/1475; F02D 41/22; F02D 41/1456; F02D 41/0085; F02D 2200/1015; Y02T 10/40; Y02T 10/47; Y02T 10/44

USPC ............... 123/479, 494, 672, 673, 690–692; 701/102–105, 111, 114, 115
See application file for complete search history.

(56) References Cited

U.S. PATENT DOCUMENTS 5,711,269 A * 1/1998 Oda et al. .................. 123/262
5,904,129 A * 5/1999 Kadota ................... 123/406.45

(Continued)

FOREIGN PATENT DOCUMENTS

CN    101790631 A    7/2010
CN    101802378 A    8/2010

(Continued)

OTHER PUBLICATIONS

Japanese Notice of Allowance Japanese Patent Application No. 2010-197412 dated Aug. 6, 2013.

(Continued)

*Primary Examiner* — Joseph Dallo
(74) *Attorney, Agent, or Firm* — Squire Patton Boggs (US) LLP

(57) ABSTRACT

An internal combustion engine diagnostic device and an internal combustion engine diagnostic method identify an abnormal cylinder having an abnormal air-fuel ratio among a plurality of cylinders during the operation of an internal combustion engine. The internal combustion engine diagnostic device comprises: an air-fuel ratio control unit for changing the air-fuel ratio in a stepwise manner by controlling a fuel injection amount adjusting means that adjusts the fuel injection amount of each of the plurality of cylinders; and an abnormal cylinder identification unit for identifying an abnormal cylinder on the basis of the relationship between each air-fuel ratio changed in a stepwise manner and the number of misfires occurring in the plurality of cylinders, the number being counted by a misfire counter for each air-fuel ratio changed in a stepwise manner.

14 Claims, 22 Drawing Sheets

(56) References Cited

U.S. PATENT DOCUMENTS

| | | | | |
|---|---|---|---|---|
| 5,947,077 | A * | 9/1999 | Yonezawa et al. | 123/295 |
| 5,960,765 | A * | 10/1999 | Iida et al. | 123/295 |
| 6,029,627 | A * | 2/2000 | VanDyne | 123/435 |
| 6,371,092 | B1 * | 4/2002 | Guglielmo et al. | 123/527 |
| 2002/0134357 | A1 * | 9/2002 | White et al. | 123/481 |
| 2003/0213229 | A1 * | 11/2003 | Steinert | 60/274 |
| 2004/0187847 | A1 * | 9/2004 | Viele et al. | 123/406.27 |
| 2004/0211249 | A1 | 10/2004 | Kiyomura et al. | |
| 2005/0109317 | A1 * | 5/2005 | Niimi | 123/406.45 |
| 2005/0241376 | A1 * | 11/2005 | Miyata et al. | 73/117.3 |
| 2006/0217872 | A1 * | 9/2006 | Moriya et al. | 701/114 |
| 2007/0084442 | A1 * | 4/2007 | Nakagawa et al. | 123/406.27 |
| 2007/0227122 | A1 * | 10/2007 | Suenaga et al. | 60/277 |
| 2008/0035132 | A1 * | 2/2008 | Katoh | F02D 41/0085 123/673 |
| 2010/0204904 | A1 | 8/2010 | Miyashita et al. | |
| 2010/0205942 | A1 | 8/2010 | Fujiwara et al. | |
| 2011/0100327 | A1 * | 5/2011 | Nakagawa et al. | 123/445 |
| 2012/0031374 | A1 | 2/2012 | Hokuto | |

FOREIGN PATENT DOCUMENTS

| | | |
|---|---|---|
| CN | 101809268 A | 8/2010 |
| JP | 63-085237 A | 4/1988 |
| JP | 03-149330 A | 6/1991 |
| JP | 03-189371 A | 8/1991 |
| JP | 07-317586 A | 12/1995 |
| JP | 08-144832 A | 6/1996 |
| JP | 10-176565 A | 6/1998 |
| JP | 2002-130010 A | 5/2002 |
| JP | 2004-270504 A | 9/2004 |
| JP | 2004-324525 A | 11/2004 |
| JP | 2007-085176 A | 4/2007 |
| JP | 2007-113396 A | 5/2007 |
| JP | 2009-270543 A | 11/2009 |
| JP | 2009-299662 A | 12/2009 |
| JP | 2010-112244 A | 5/2010 |

OTHER PUBLICATIONS

Chinese Office Action application No. 201180042443.1 issued Jan. 6, 2015.
Japanese Notice of Allowance application No. 2012-531774 dated Nov. 11, 2014.
Japanese Office Action application No. 2012-531774 dated Apr. 1, 2014.
International Search Report and Written Opinion dated Oct. 18, 2011 corresponding to International Patent Application No. PCT/JP2011/068241.

* cited by examiner

FIG. 18
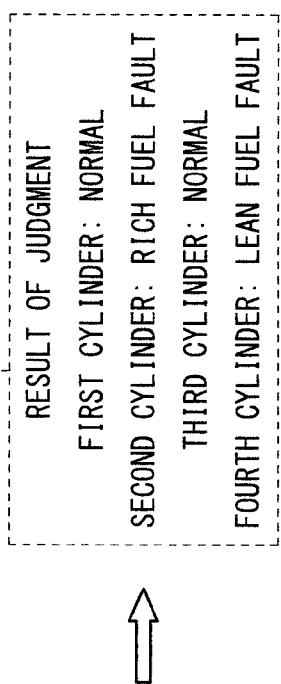
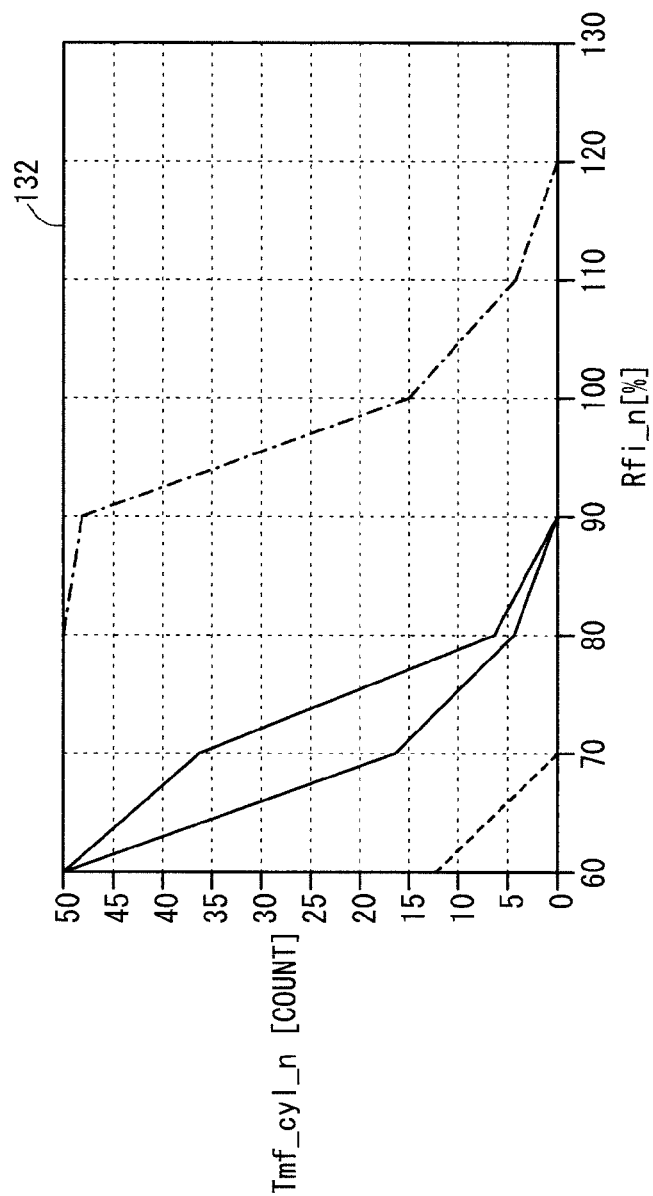

INTERNAL COMBUSTION ENGINE DIAGNOSTIC DEVICE AND INTERNAL COMBUSTION ENGINE DIAGNOSTIC METHOD

TECHNICAL FIELD

The present invention relates to an internal combustion engine diagnosing apparatus (device) and an internal combustion engine diagnosing method for identifying a malfunctioning cylinder having an abnormal air-fuel ratio among a plurality of cylinders of an internal combustion engine while the internal combustion engine is in operation.

BACKGROUND ART

While internal combustion engines on automobiles or the like are in operation, it has been customary from the standpoint of exhaust gas purification to add an air-fuel ratio sensor and control the amount of a supplied fuel for maintaining a good air-fuel ratio according to an air-fuel ratio feedback control process.

Even if an exhaust gas itself is kept in a favorable condition, however, variation in the air-fuel ratios in different cylinders tend to lower the purification ratio of a catalyst which purifies the exhaust gas. Accordingly, efforts have been made to monitor variation in the air-fuel ratios in respective cylinders {see Japanese Laid-Open Patent Publication No. 2009-270543 (hereinafter referred to as "JP2009-270543A") and Japanese Laid-Open Patent Publication No. 03-189371 (hereinafter referred to as "JP03-189371A")}.

According to JP2009-270543A, a cyclic period in which the combustion of fuel is cycled once through all the cylinders is regarded as one cycle, and air-fuel ratio fluctuations in one cycle are measured. If the measured air-fuel ratio fluctuations are too large, the internal combustion engine is judged as malfunctioning (see Abstract).

According to JP03-189371A, when a misfire is detected, ignition control processes for the respective cylinders are individually stopped successively, and an average output value of the air-fuel ratio sensor and output amplitude values thereof at this time are read and compared with the corresponding values read prior to stoppage of the ignition control processes, thereby identifying a misfiring cylinder (see claim 1). It is stated in the publication that the internal combustion engine may have one air-fuel ratio sensor or a plurality of air-fuel ratio sensors (page 4, lower left column, lines 6 through 10).

SUMMARY OF INVENTION

According to JP2009-270543A, it is easy to judge the occurrence of an inter-cylinder malfunction wherein the air-fuel ratios in respective cylinders are unbalanced. However, it is not possible to identify which cylinder is suffering a malfunction.

According to JP03-189371A, though a malfunctioning cylinder which is misfiring can be identified, it is not possible to judge whether the air-fuel ratios in the respective cylinders are favorable or not.

The present invention has been made in view of the above drawbacks. It is an object of the present invention to provide an internal combustion engine diagnosing apparatus and an internal combustion engine diagnosing method which are capable of identifying a malfunctioning cylinder having an abnormal air-fuel ratio highly accurately in a simple manner.

According to the present invention, there is provided an internal combustion engine diagnosing apparatus for identifying a malfunctioning cylinder having an abnormal air-fuel ratio among a plurality of cylinders of an internal combustion engine while the internal combustion engine is in operation, comprising an air-fuel ratio controller for changing air-fuel ratios of the cylinders stepwise by controlling a fuel injection quantity adjusting unit for adjusting respective fuel injection quantities of the cylinders, and a malfunctioning cylinder identifier for identifying the malfunctioning cylinder based on a relationship between the numbers of misfires of the cylinders which are counted by a misfire counter with respect to each of the air-fuel ratios which are changed stepwise, and the air-fuel ratios which are changed stepwise.

According to the present invention, it is possible to identify a malfunctioning cylinder having an abnormal air-fuel ratio highly accurately in a simple manner.

Generally, the relationship between an air-fuel ratio and the occurrence of a misfire is determined to a certain extent depending on the configuration of the internal combustion engine. For example, when an actual air-fuel ratio is equal to the stoichiometric air-fuel ratio, essentially no misfire occurs. As an actual air-fuel ratio changes to a leaner air-fuel ratio or a richer air-fuel ratio, the ratio of misfires that occur to the number of times that the fuel is injected into the internal combustion engine increases. According to the present invention, the air-fuel ratio is changed stepwise and the number of misfires that occur is counted to determine a combustible fuel injection range for detecting an air-fuel ratio failure. Consequently, it is easy to detect an air-fuel ratio failure, making it possible to identify a malfunctioning cylinder highly accurately.

The air-fuel ratio is generally controlled in internal combustion engines, and the number of misfires that occur can be counted by a crankshaft angle sensor and a processor, for example. Therefore, air-fuel ratios can be controlled and the number of misfires that occur can be counted, using an existing arrangement incorporated in internal combustion engines. According to the present invention, a malfunctioning cylinder is identified based on the relationship between an air-fuel ratio that is changed stepwise and the number of misfires that occur in a plurality of cylinders. Thus, it is possible to identify a malfunctioning cylinder simply by using an air-fuel ratio and the number of misfires that occur which can be controlled and judged by an existing arrangement incorporated in internal combustion engines.

The air-fuel ratio controller may control the fuel injection quantity adjusting unit to adjust the fuel injection quantities of the cylinders successively one by one, thereby to increase or reduce the air-fuel ratios stepwise, while no load is being imposed on the internal combustion engine. Since the cylinders can be confirmed for a malfunction one by one, it is possible to judge a malfunctioning cylinder more accurately.

The state in which no load is being imposed on the internal combustion engine includes a state in which the internal combustion engine may be idling, for example.

The air-fuel ratio controller may reduce the fuel injection quantities stepwise, starting from a preset value for achieving a stoichiometric air-fuel ratio. Inasmuch as the air-fuel ratios are changed from the stoichiometric air-fuel ratio at which essentially no misfire occurs to a leaner air-fuel ratio at which the number of misfires increases, it is possible to determine a malfunctioning cylinder accurately, and also to minimize adverse effects that the occurrence of misfires has on ignition plugs or a catalyst.

Specifically, when misfires occur frequently, the temperature in the combustion chamber of the cylinder drops, tending to smoke the ignition plug, i.e., depositing more soot on the ignition plug. As a result, it is highly likely for the cylinder to cause more misfires due to the deposited soot, and it may not be possible to judge accurately the number of misfires which are caused by a change in the air-fuel ratio. The soot deposited on the ignition plug may possibly adversely affect the durability of the ignition plug. When misfires occur, unburned gases which have not been combusted in the combustion chamber are discharged from the internal combustion engine, and then may be ignited in the catalyst by the heat thereof. If this phenomenon happens frequently, the durability of the catalyst may possibly be adversely affected. According to the present invention, the combustion chamber gradually changes from a normally combusting state to a more misfiring state, the drop in the temperature in the combustion chamber is minimized, thereby preventing the above deficiencies from taking place.

For example, an air-fuel ratio fault is judged as follows: When the fuel injection quantities are lower than a lean combustion limit value, which is determined depending on characteristics of the internal combustion engine, if there is a cylinder whose number of misfires is smaller than a first threshold value, the malfunctioning cylinder identifier may judge the cylinder as suffering a rich fuel fault in which the cylinder is being supplied with excessive fuel. It is thus possible to determine a rich fuel fault simply.

Similarly, when the fuel injection quantities represent a preset value for achieving the stoichiometric air-fuel ratio or a predetermined value within a combustible range determined depending on characteristics of the internal combustion engine, if there is a cylinder whose number of misfires is larger than a second threshold value, the malfunctioning cylinder identifier may judge the cylinder as suffering a lean fuel fault in which the cylinder is being short of fuel. It is thus possible to determine a lean fuel fault simply.

According to the present invention, there is provided an internal combustion engine diagnosing apparatus for identifying a malfunctioning cylinder having an abnormal air-fuel ratio among a plurality of cylinders of an internal combustion engine while the internal combustion engine is in operation, comprising a malfunctioning cylinder identifier for changing air-fuel ratios of the cylinders stepwise by controlling the respective fuel injection quantities of the cylinders, and identifying a malfunctioning cylinder based on the relationship between the air-fuel ratios which are changed stepwise and the numbers of misfires of the cylinders, and a protector for stopping changing the air-fuel ratios stepwise to protect an ignition plug or an exhaust gas purification filter if the number of misfires of either one of the cylinders or the total of the numbers of misfires of the cylinders exceeds a predetermined value while the air-fuel ratios which are being changed stepwise.

According to the present invention, if the number of misfires of either one of the cylinders or the total of the numbers of misfires of the cylinders exceeds a predetermined value while the air-fuel ratios which are being changed stepwise, the protector stops changing the air-fuel ratios stepwise to protect an ignition plug or an exhaust gas purification filter. Consequently, the ignition plug or the exhaust gas purification filter is prevented from being adversely affected depending on the predetermined value.

Specifically, as described above, when misfires occur frequently in a cylinder, the temperature in the combustion chamber of the cylinder drops, tending to smoke the ignition plug, i.e., depositing more soot on the ignition plug. As a result, it is highly likely for the cylinder to cause more misfires due to the deposited soot, and it may not be possible to judge accurately the number of misfires which are caused by a change in the air-fuel ratio. The soot deposited on the ignition plug may possibly adversely affect the durability of the ignition plug. When misfires occur, unburned gases which have not been combusted in the combustion chamber are discharged from the internal combustion engine, and then may be ignited in the catalyst by the heat of the exhaust gas purification filter (catalyst). If this phenomenon happens frequently, the catalyst may possibly be heated to an excessively high temperature, tending to adversely affect the durability of the catalyst. According to the present invention, if the number of misfires of either one of the cylinders or the total of the numbers of misfires of the cylinders exceeds a predetermined value while the air-fuel ratios which are being changed stepwise, the protector stops changing the air-fuel ratios stepwise to protect an ignition plug or an exhaust gas filter. Therefore, the filter is prevented from being adversely affected by setting the predetermined value to a value which is effective to prevent the temperature of the catalyst from rising excessively, from among data values of combustibility in the catalyst as a result of the frequent occurrence of misfires. The filter is also prevented from being adversely affected by setting the predetermined value to a value which is smaller than the number of misfires that tends to deposit soot on the ignition plug.

The malfunctioning cylinder identifier may count the number of misfires of either one of the cylinders or the total of the numbers of misfires of the cylinders per each measuring period in which the air-fuel ratios are changed. It is thus possible to judge a fault of the number of misfires of either one of the cylinders or the total of the numbers of misfires of the cylinders for every air-fuel ratio value, making it possible to appropriately detect a misfire as a fault when a malfunctioning cylinder is identified.

According to the present invention, there is provided an internal combustion engine diagnosing apparatus for identifying a malfunctioning cylinder having an abnormal air-fuel ratio among a plurality of cylinders of an internal combustion engine while the internal combustion engine is in operation, wherein if the internal combustion engine has a total air-fuel ratio deviating from a target air-fuel ratio, an air-fuel ratio feedback control process can be carried out for applying the same corrective value to each of the cylinders to equalize the total air-fuel ratio of the internal combustion engine to the target air-fuel ratio, wherein when the internal combustion engine is diagnosed, at least the air-fuel ratio feedback control process is carried out on each of the cylinders and each of the cylinders is monitored for a misfire while the internal combustion engine is idling after being warmed up, wherein when the misfire occurs, the air-fuel ratio feedback control process is discontinued and a basic fuel injection control process is started or continued to judge whether the misfire continues or not, wherein if the misfire continues even during the basic fuel injection control process, it is judged whether the corrective value exceeds a first threshold value to judge a rich fuel fault in which each of the cylinders is being supplied with excessive fuel or a second threshold value to judge a lean fuel fault in which each of the cylinders is being short of fuel, and wherein if the corrective value exceeds the first threshold value, it is decided that one of the cylinders which causes a misfire at the time is suffering the rich fuel fault, or if the corrective value exceeds the second threshold value, it is decided that one of the cylinders which causes a misfire at the time is suffering the lean fuel fault.

According to the present invention, even if there is no problem about the controlling of the air-fuel ratio of the overall internal combustion engine, it is possible to detect a deficiency of the controlling of the air-fuel ratio which may have occurred in the individual cylinders.

Specifically, while the internal combustion engine is in normal operation, both the basic fuel injection control process and the air-fuel ratio feedback control process are used in combination. If the internal combustion engine has four cylinders and one of them, e.g., the first cylinder, is suffering a lean fuel fault, i.e., is short of fuel, then the air-fuel ratios of the other three cylinders, i.e., the second through fourth cylinders, are adjusted to increase supplied fuel, and the air-fuel ratio of the first cylinder is adjusted to reduce supplied fuel by the air-fuel ratio feedback control process, thereby bringing the total air-fuel ratio of the internal combustion engine to a target air-fuel ratio (see FIGS. 19 and 20). In this case, the lean fuel fault of the first cylinder cannot be detected.

According to the present invention, when the internal combustion engine is diagnosed, the air-fuel ratio feedback control process is canceled and only the basic fuel injection control process is carried out. Therefore, a malfunctioning cylinder can be identified highly accurately and easily. Even though the internal combustion engine to be inspected has no air-fuel ratio sensors for detecting the air-fuel ratios of the respective cylinders, but has the air-fuel ratio sensor for detecting the total air-fuel ratio only, it is possible to identify a malfunctioning cylinder highly accurately and easily.

The internal combustion engine diagnosing apparatus may have an air-fuel ratio controller for controlling air-fuel ratios of the cylinders by controlling a fuel injection quantity adjusting unit for adjusting the respective fuel injection quantities of the cylinders, and a malfunctioning cylinder identifier for identifying a malfunctioning cylinder, wherein the fuel injection quantity adjusting unit is controlled to change stepwise the air-fuel ratio of at least one of the cylinders. The malfunctioning cylinder identifier may identify a malfunctioning cylinder based on the relationship between the numbers of misfires of the cylinders which are counted by a misfire counter with respect to each of the air-fuel ratios which are changed stepwise, and the air-fuel ratios which are changed stepwise.

According to the present invention, there is also provided an internal combustion engine diagnosing method for identifying a malfunctioning cylinder having an abnormal air-fuel ratio among a plurality of cylinders of an internal combustion engine while the internal combustion engine is in operation, comprising the steps of changing air-fuel ratios of the cylinders stepwise by controlling respective fuel injection quantities of the cylinders, counting the numbers of misfires of the cylinders with respect to each of the air-fuel ratios which are changed stepwise, and identifying the malfunctioning cylinder based on a relationship between the air-fuel ratios which are changed stepwise and the numbers of misfires of the cylinders.

The step of changing the air-fuel ratios may comprise controlling the fuel injection quantities of the cylinders successively one by one thereby to increase or reduce the air-fuel ratios stepwise, while no load is being imposed on the internal combustion engine.

The step of changing the air-fuel ratios may comprise reducing the fuel injection quantities stepwise, starting from a preset value for achieving a stoichiometric air-fuel ratio.

The step of identifying the malfunctioning cylinder may comprise, when the fuel injection quantities are lower than a lean combustion limit value, which is determined depending on characteristics of the internal combustion engine, if there is a cylinder whose number of misfires is smaller than a first threshold value, judging the cylinder as suffering a rich fuel fault in which the cylinder is being supplied with excessive fuel.

The step of identifying the malfunctioning cylinder may comprise, when the fuel injection quantities represent a preset value for achieving the stoichiometric air-fuel ratio or a predetermined value within a combustible range determined depending on the characteristics of the internal combustion engine, if there is a cylinder whose number of misfires is larger than a second threshold value, judging the cylinder as suffering a lean fuel fault in which the cylinder is being short of fuel.

According to the present invention, there is also provided an internal combustion engine diagnosing method for identifying a malfunctioning cylinder having an abnormal air-fuel ratio among a plurality of cylinders of an internal combustion engine while the internal combustion engine is in operation, comprising the steps of changing air-fuel ratios of the cylinders stepwise by controlling respective fuel injection quantities of the cylinders and identifying a malfunctioning cylinder based on the relationship between the air-fuel ratios which are changed stepwise and the numbers of misfires of the cylinders, and stopping changing the air-fuel ratios stepwise to protect an ignition plug or an exhaust gas purification filter if the number of misfires of either one of the cylinders or total of the numbers of misfires of the cylinders exceeds a predetermined value while the air-fuel ratios which are being changed stepwise.

In the step of identifying a malfunctioning cylinder, the number of misfires of either one of the cylinders or the total of the numbers of misfires of the cylinders may be counted per each measuring period in which the air-fuel ratios are changed.

According to the present invention, there is provided an internal combustion engine diagnosing method for identifying a malfunctioning cylinder having an abnormal air-fuel ratio among a plurality of cylinders of an internal combustion engine while the internal combustion engine is in operation, comprising the steps of carrying out basic fuel injection control to control the respective air-fuel ratios of the cylinders by adjusting the respective fuel injection quantities of the cylinders, counting the numbers of misfires of the respective cylinders, and identifying the malfunctioning cylinder, wherein the step of carrying out basic fuel injection control comprises carrying out a basic fuel injection control process for controlling the respective air-fuel ratios of the cylinders to equalize the air-fuel ratios of the cylinders to a target value of the total internal combustion engine, and carrying out an air-fuel ratio feedback control process for, if the internal combustion engine has a total air-fuel ratio deviating from a target air-fuel ratio, applying the same corrective value to each of the cylinders to equalize the total air-fuel ratio of the internal combustion engine to the target air-fuel ratio, wherein the step of carrying out the basic fuel injection control process comprises, when the internal combustion engine is diagnosed, carrying out at least the air-fuel ratio feedback control process on each of the cylinders and monitoring each of the cylinders for a misfire while the internal combustion engine is idling after being warmed up, and when the misfire occurs, discontinuing the air-fuel ratio feedback control process and starting or continuing the basic fuel injection control process to judge whether the misfire continues or not, and if the misfire continues even during the basic fuel injection control process, judging whether the corrective value exceeds a first threshold value to judge a rich fuel fault in which each of the cylinders is being supplied with excessive fuel or a second threshold value to judge a lean fuel fault in which each of the cylinders is being short of fuel, and if the corrective value exceeds the first threshold value, deciding that one of the cylinders which causes a misfire at the time is suffering the rich fuel fault, or if the corrective value exceeds the second threshold value, deciding that one of the cylinders which causes a misfire at the time is suffering the lean fuel fault.

BRIEF DESCRIPTION OF DRAWINGS

FIG. 18 is a diagram showing a data table of accumulated values representing the number of misfires which are acquired by the internal combustion engine diagnosing apparatus, a graph based on the data table, and a fourth example of a screen that is displayed on the display unit of the internal combustion engine diagnosing apparatus;

DESCRIPTION OF EMBODIMENTS

A. Embodiment

Figure 1:
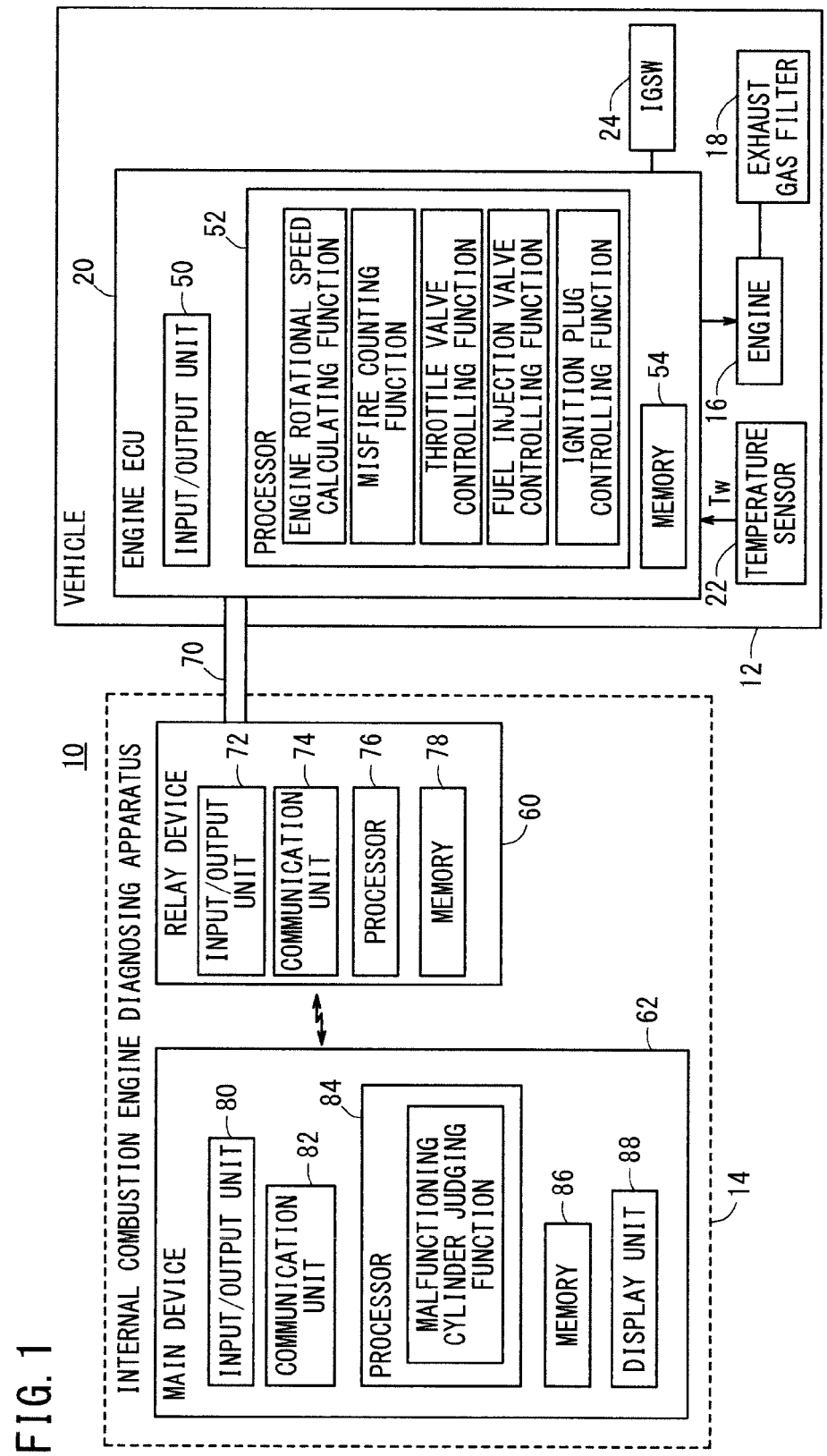
FIG. 1 is a block diagram showing the general configuration of an internal combustion engine diagnosing system having an internal combustion engine diagnosing apparatus according to an embodiment of the present invention.

1. Configuration (1) Overall Configuration:

FIG. 1 is a block diagram showing the general configuration of an internal combustion engine diagnosing system 10 (hereinafter referred to as "system 10") having an internal combustion engine diagnosing apparatus 14 (hereinafter referred to as "diagnosing apparatus 14") according to an embodiment of the present invention. The system 10 has a vehicle 12 including an engine 16 to be diagnosed and the diagnosing apparatus 14 which diagnoses the engine 16.

(2) Vehicle 12:

(a) Overall Configuration:

The vehicle 12 includes, in addition to the engine 16, an exhaust gas filter 18 (hereinafter referred to as "filter 18") for purifying exhaust gases from the engine 16, an engine electronic control unit 20 (hereinafter referred to as "engine ECU 20") for controlling the output power of the engine 16, a temperature sensor 22 for detecting the temperature Tw [° C.] of the coolant of the engine 16, and an ignition switch 24 (hereinafter referred to as "IGSW 24").

Figure 2:
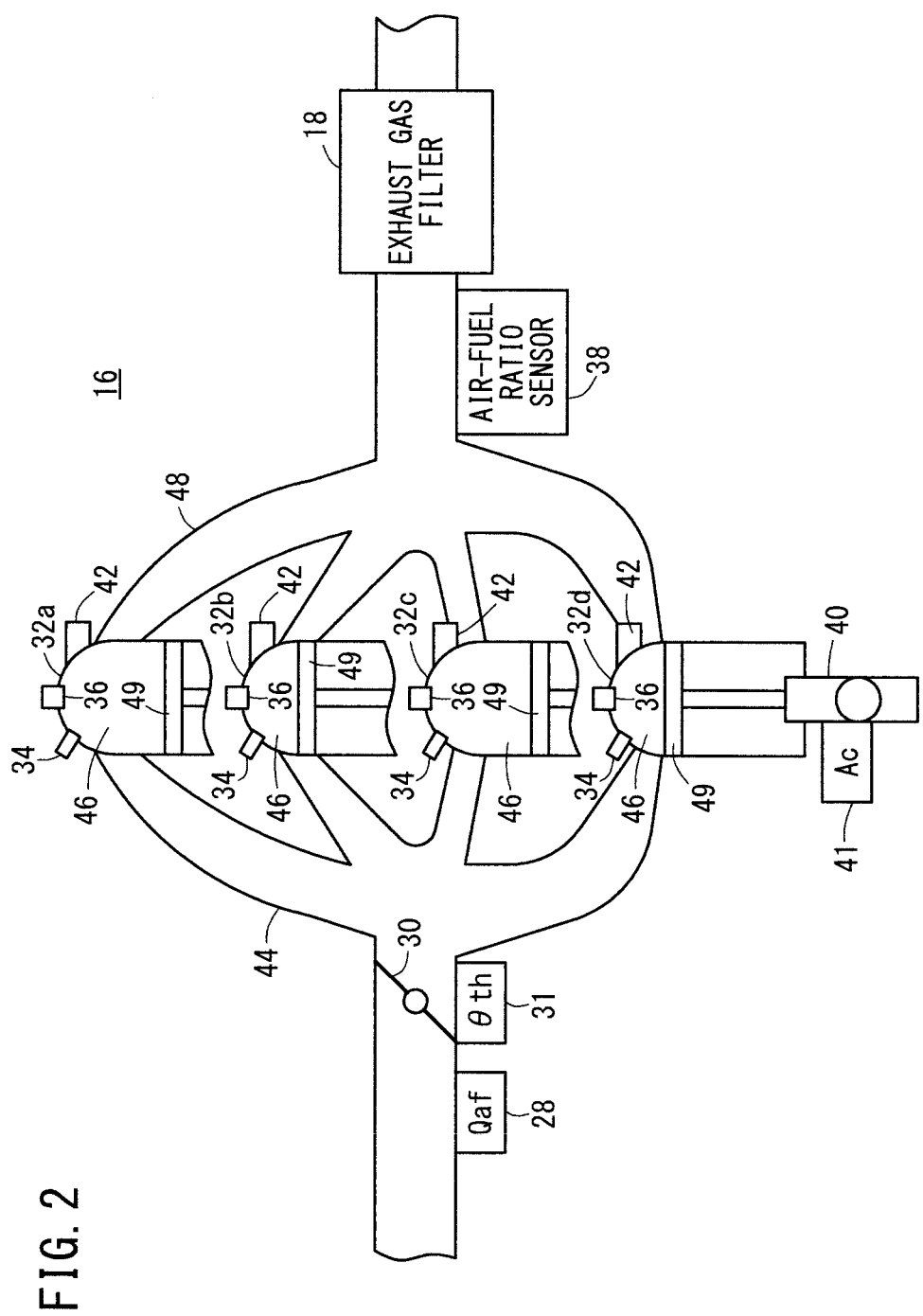
FIG. 2 is a view showing the general configuration of an internal structure of an engine.

(b) Engine 16:

FIG. 2 is a view showing the general configuration of an internal structure of the engine 16. The engine 16, which is a so-called in-line four-cylinder engine, has an intake air quantity sensor 28, a throttle valve 30, an opening sensor 31, first through fourth cylinders 32a through 32d (hereinafter referred to as "cylinders 32"), fuel injection valves 34 mounted respectively on the cylinders 32, ignition plugs 36 mounted respectively on the cylinders 32, an air-fuel ratio sensor 38, a crankshaft 40, a crankshaft angle sensor 41, and top-dead-center sensors 42 mounted respectively on the cylinders 32.

The intake air quantity sensor 28 detects an air quantity (hereinafter referred to as "intake air quantity Qaf") introduced into the engine 16 depending on the opening θth [°] of the throttle valve 30, and outputs the detected intake air quantity Qaf to the engine ECU 20. The throttle valve 30 is disposed in an intake manifold 44. The opening sensor 31 detects an opening θth of the throttle valve 30 and outputs the detected opening θth to the engine ECU 20. The fuel injection valves 34 and the ignition plugs 36 are disposed in facing relation to respective combustion chambers 46 of the cylinders 32. The air-fuel ratio sensor 38 includes an oxygen sensor, not shown, and is disposed in an exhaust manifold 48. The air-fuel ratio sensor 38 detects a total air-fuel ratio (hereinafter referred to as "total air-fuel ratio Raf_total") of the engine 16, and outputs the detected total air-fuel ratio Raf_total to the engine ECU 20. The crankshaft angle sensor 41 detects a rotational angle (hereinafter referred to as "crankshaft angle Ac") [°] of the crankshaft 40, and outputs the detected crankshaft angle Ac to the engine ECU 20. The top-dead-center sensors 42 detect respective top dead centers of pistons 49, and output the detected top dead centers to the engine ECU 20.

(c) Exhaust Gas Filter 18:

The exhaust gas filter 18 is disposed downstream of the exhaust manifold 48, i.e., at an exhaust outlet thereof, and purifies exhaust gases from the engine 16 and discharges the purified exhaust gases. According to the present embodiment, the exhaust gas filter 18 includes a three-way catalyst for purifying exhaust gases.

(d) Engine ECU 20:

The engine ECU 20, which serves to control operation of the engine 16, includes an input/output unit 50, a processor 52, and a memory 54, as shown in FIG. 1.

According to the present invention, the engine ECU 20 performs an engine rotational speed calculating function, a misfire counting function, a throttle valve controlling function, a fuel injection valve controlling function, and an ignition plug controlling function.

The engine rotational speed calculating function is a function to calculate a rotational speed of the engine (engine rotational speed Ne) [rpm] based on output signals from the respective top-dead-center sensors 42. According to the present invention, the engine rotational speed calculating function is combined with the top-dead-center sensors 42, making up an engine rotational speed sensor. Alternatively, an engine rotational speed sensor may be provided independently of the engine ECU 20, and may have its output signal sent to the engine ECU 20.

The misfire counting function is a function to judge whether there is a misfire occurring in each of the cylinders 32 or not based on an output signal from the crankshaft angle sensor 41, and count misfires in each of the cylinders 32 if a misfire is judged as occurring. According to the present embodiment, the misfire counting function is combined with the crankshaft angle sensor 41, making up a misfire counter. A known arrangement may be used to judge whether there is a misfire occurring or not. For example, a combustion pressure may be detected at a predetermined crankshaft angle, and a misfire may be judged as occurring if the detected combustion pressure is equal to or smaller than a predetermined value. Alternatively, a misfire may be judged as occurring if a crankshaft angular velocity at a predetermined crankshaft angle is equal to or smaller than a predetermined value.

The throttle valve controlling function is a function to control the opening θth of the throttle valve 30 based on the operated amount of an accelerator pedal, not shown, or the like, thereby controlling the output power of the engine 16.

The fuel injection valve controlling function is a function to control the fuel injection quantity Qfi (target value) from each of the fuel injection valves 34 based on the operated amount of the accelerator pedal, not shown, or the like, thereby controlling the output power of the engine 16.

The ignition plug controlling function is a function to control the ignition timing of each of the ignition plugs 36 based on the operated amount of the accelerator pedal, not shown, or the like, thereby controlling the output power of the engine 16.

(3) Diagnosing Apparatus 14:

The diagnosing apparatus 14 serves to diagnose each of the cylinders 32 for an abnormal air-fuel ratio. As shown in FIG. 1, the diagnosing apparatus 14 has a relay device 60 and a main device 62.

The relay device 60 serves to relay communications between the main device 62 and the engine ECU 20. The relay device 60 has a cable 70 connected to the engine ECU 20, an input/output unit 72 connected to the cable 70, a communication unit 74 for performing wireless communications with the main device 62, a processor 76 for controlling various components, and a memory 78 for storing various programs and data such as a control program run by the processor 76.

The main device 62 has an input/output unit 80 including a keyboard, a touch pad, etc., not shown, a communication unit 82 for performing wireless communications with the relay device 60, a processor 84 for controlling various components and judging whether each of the cylinders 32 is malfunctioning or not, a memory 86 for storing various programs and data such as a control program and a malfunction diagnosing program run by the processor 84, and a display unit 88 for displaying various items of information. The main device 62 may have a hardware configuration such as a commercially available laptop personal computer, for example. A malfunction judging function that is performed for each of the cylinders 32 by the processor 84 will hereinafter be referred to as "malfunctioning cylinder judging function".

When the diagnosing apparatus 14 is used to diagnose each of the cylinders 32 for a malfunction, the user connects the distal end of the cable 70 of the relay device 60, whose proximal end has been connected to the input/output unit 72 of the relay device 60, to a connector (data link connector), not shown, on the instrument panel, not shown, of the vehicle 12. Thereafter, the user operates the input/output unit 80 of the main device 62 to cause the main device 62 to diagnose each of the cylinders for a malfunction. At this time, the main device 62 controls the engine ECU 20 to operate the engine 16. Details of a process carried out by the main device 62 for diagnosing each of the cylinders 32 for a malfunction will be described later.

2. Diagnosing Cylinders 32 for Malfunction

Figure 3:
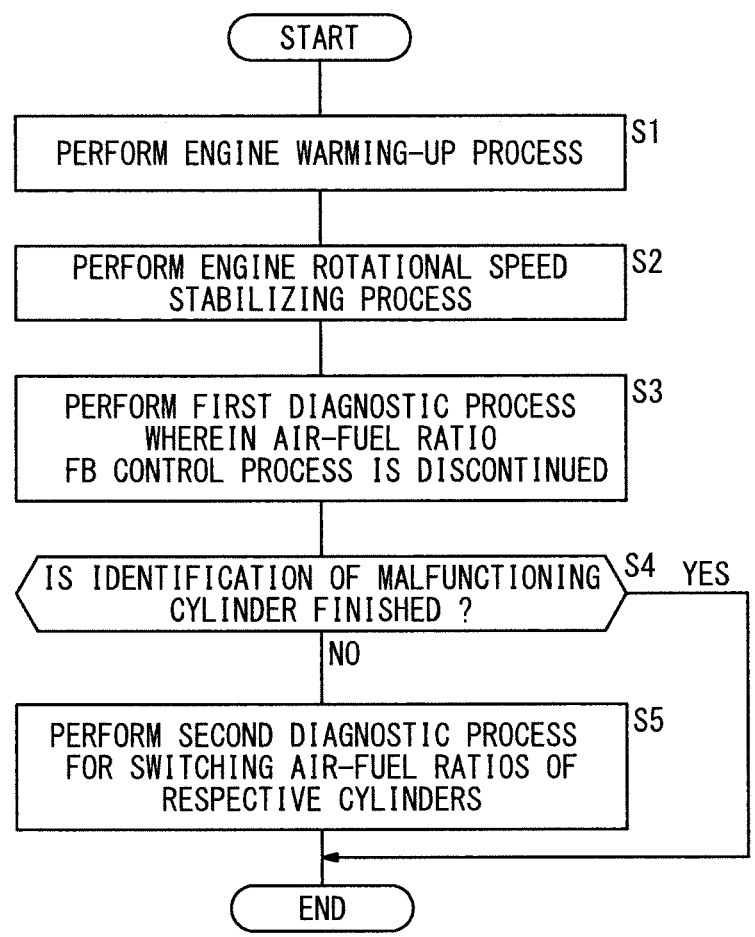
FIG. 3 is a flowchart of the general processing sequence of a malfunction diagnosing process for each cylinder.
Figure 4:
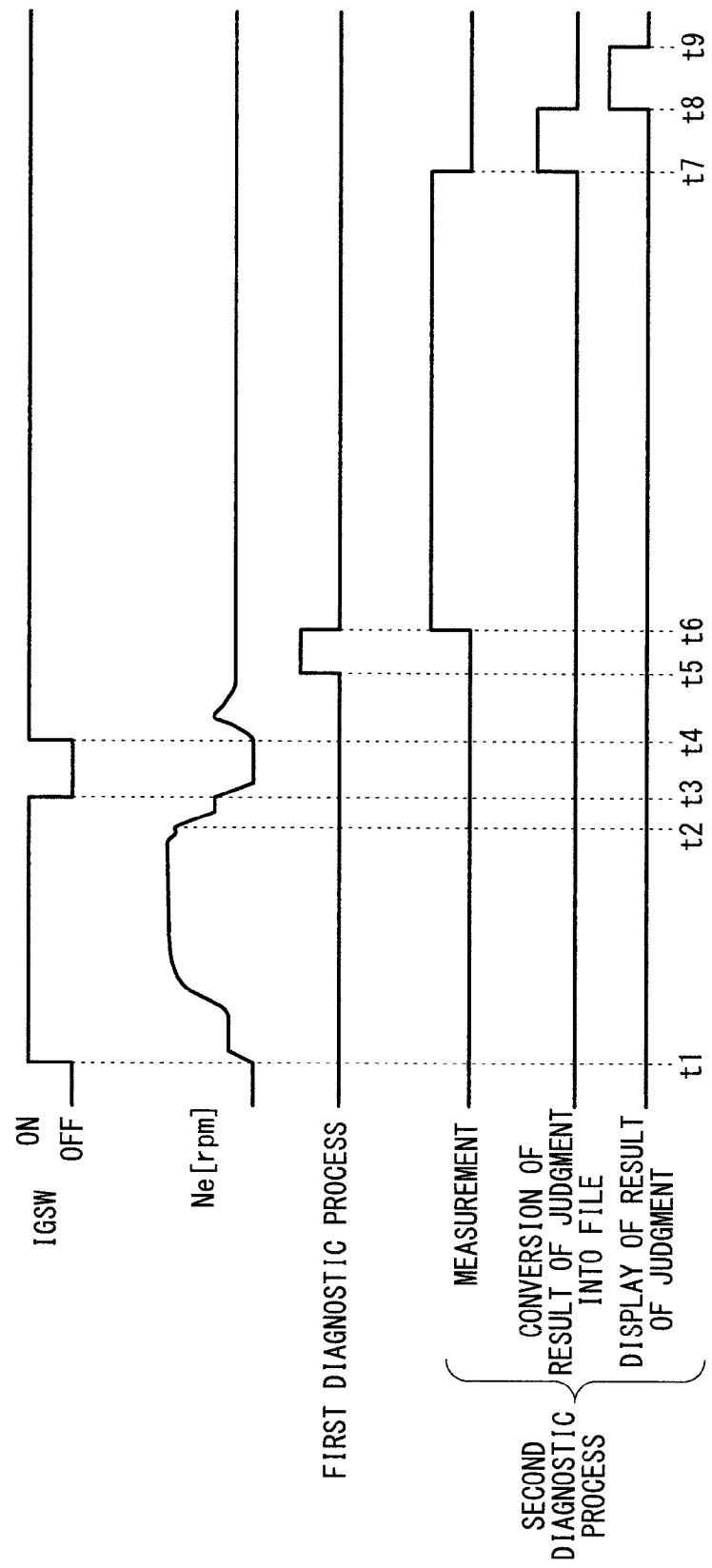
FIG. 4 is a timing chart showing by way of example the relationship between various signals, numerical values, and processing details of the processing sequence shown in FIG. 3.
Figure 5:
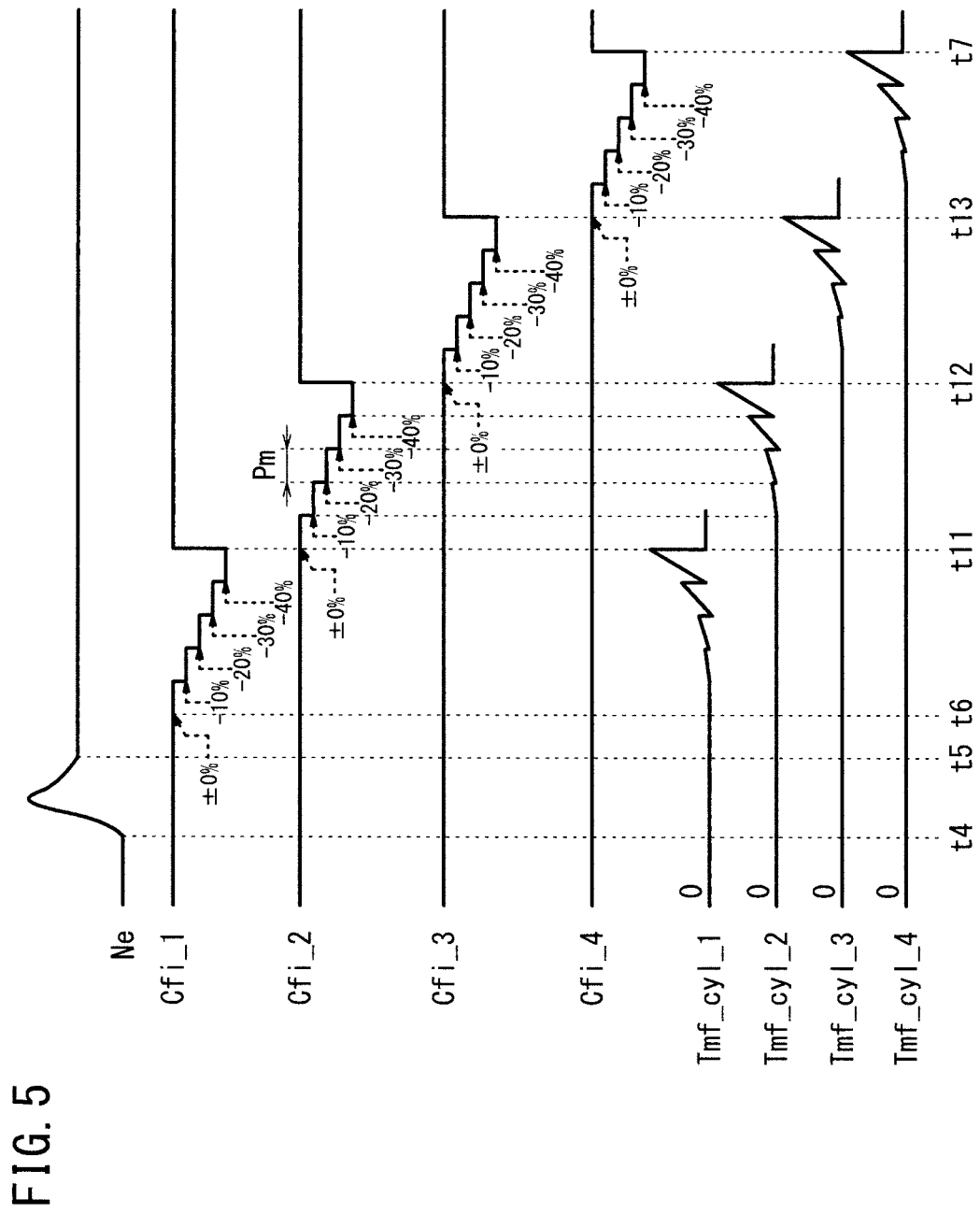
FIG. 5 is a timing chart of the details of a portion (including measured data generated by a measuring process) of the relationship shown in FIG. 4.

FIG. 3 is a flowchart of the general processing sequence of a malfunction diagnosing process for each cylinder 32. FIG. 4 is a timing chart showing by way of example the relationship between various signals, numerical values, and processing details of the processing sequence shown in FIG. 3. FIG. 5 is a timing chart of the details of a portion (including measured data generated by a measuring process) of the relationship shown in FIG. 4.

As described above, before the malfunction diagnosing process is started, the user connects the cable 70 of the relay device 60 to the engine ECU 20 of the vehicle 12, allowing the main device 62 of the diagnosing apparatus 14 to communicate with the engine ECU 20 through the relay device 60.

When the diagnosing apparatus 14 receives a command from the user to start a malfunction diagnosing process through the input/output unit 80 of the main device 62, the diagnosing apparatus 14 controls the engine ECU 20 to perform an engine warming-up process for warming up the engine 16 in step S1.

Figure 6:
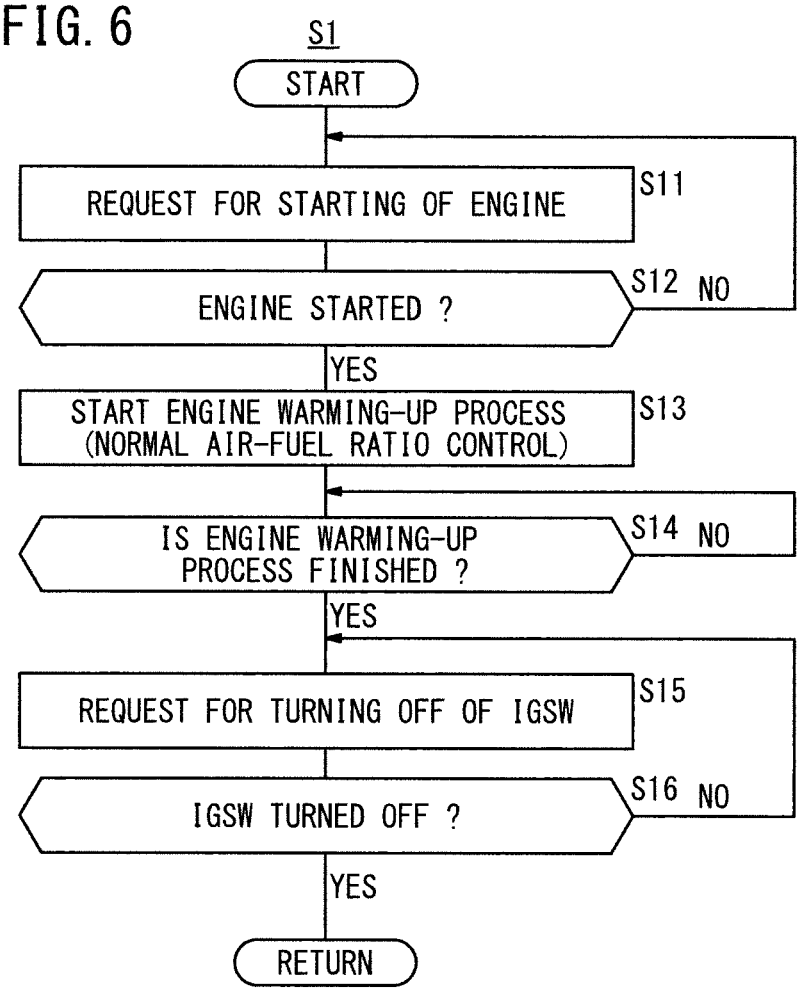
FIG. 6 is a flowchart of an engine warming-up process.

FIG. 6 is a flowchart of the engine warming-up process (details of step S1 shown in FIG. 3). In step S11 shown in FIG. 6, the processor 84 of the diagnosing apparatus 14 displays, on the display unit 88, a message for prompting the user to turn on the IGSW 24 to start the engine 16, and asks the engine ECU 20 if the engine 16 has started or not.

If the engine 16 has not started, i.e., if the engine ECU 20 has not indicated the starting of the engine 16 in step S12 (S12: NO), then control goes back to step S11. If the engine 16 has started, i.e., if the engine ECU 20 has indicated the starting of the engine 16 in step S12 (S12: YES) (at time t1 in FIG. 4), then the processor 84 requests the engine ECU 20 to start an engine warming-up process, and in response to the request, the engine ECU 20 starts to warm up the engine 16 in step S13. The engine warming-up process increases the engine rotational speed Ne up to a given value (e.g., 3000 rpm), for example, for warming-up operation.

In the engine warming-up process, the engine ECU uses a normal air-fuel ratio control process that is generally used when the engine 16 is to be operated. The normal air-fuel ratio control process is used in the fuel injection valve controlling function of the engine ECU 20, and is a combination of a basic fuel injection control process and an air-fuel ratio feedback control process (hereinafter referred to as "air-fuel ratio FB control process").

According to the present embodiment, the basic fuel injection control process is a control process for bringing the ratios of a fuel (gasoline in the embodiment) to air in air-fuel mixtures supplied to the respective cylinders 32 (hereinafter referred to as "cylinder air-fuel ratios Raf_1 through Raf_4" or collectively as "air-fuel ratios Raf_n") into a stoichiometric air-fuel ratio (fuel:air=1:14.7).

Specifically, in the basic fuel injection control process, the relationship between intake air quantities Qaf detected by the intake air quantity sensor 28 and fuel injection quantities Qfi from the fuel injection valves 34 is preset as a map, and the fuel injection valves 34 are controlled depending on target values for fuel injection quantities Qfi which correspond to the detected intake air quantity Qaf.

However, because of variation in the operation timings (tappet clearances) of intake/exhaust valves, not shown, of the cylinders 32 and aging of the fuel injection valves 34, etc., the air-fuel ratios Raf_n of the cylinders 32 and the total air-fuel ratio Raf_total of the engine 16 may not necessarily be equal to the stoichiometric air-fuel ratio.

According to the present embodiment, the air-fuel ratio FB control process is a control process for equalizing the total air-fuel ratio Raf_total to the stoichiometric air-fuel ratio using a feedback loop. Specifically, if the air-fuel ratio detected by the air-fuel ratio sensor 38 is not equal to the stoichiometric air-fuel ratio, then the fuel injection quantities Qfi from all the fuel injection valves 34 are increased or reduced to make the detected air-fuel ratio equal to the stoichiometric air-fuel ratio, thereby achieving the stoichiometric air-fuel ratio. At this time, the fuel injection quantities Qfi are corrected by a corrective value Pc. Though the corrective value Pc is a corrective value for fuel injection ratios Rfi_n [%] (target values) of the respective cylinders 32, to be described later, it may be used as a corrective value for other values (e.g., the fuel injection quantities Qfi (target values) or the total air-fuel ratio Raf_total).

According to the present embodiment, since only one air-fuel ratio sensor 38 is disposed downstream of the exhaust manifold 48, the air-fuel ratios Raf_n of the respective cylinders 32 are not detected. According to the basic fuel injection control process, therefore, the total air-fuel ratio Raf_total) of the engine 16, but not each of the air-fuel ratios Raf_n of the cylinders 32, can be converged to the stoichiometric air-fuel ratio.

In step S14, the processor 84 of the diagnosing apparatus 14 judges whether the engine 16 has been warmed up or not. Specifically, the processor 84 requests the engine ECU 20 to send the temperature Tw of the coolant of the engine 16. In response to the request, the engine ECU sends the temperature Tw detected by the temperature sensor 22 to the processor 84. The processor 84 judges whether or not the temperature Tw is equal to or higher than a threshold value TH_Tw [° C.]. The threshold value TH_Tw is a threshold value to judge whether the engine 16 has been warmed up or not.

If the engine 16 has not been warmed up (S14: NO), then, step S14 is repeated. If the engine 16 has been warmed up (S14: YES) (at time t2 in FIG. 4), then control goes to step S15.

In step S15, the processor 84 requests the engine ECU 20 to finish the engine warming-up process, and displays a message to prompt the user to turn off the IGSW 24. If the IGSW 24 remains on in step S16 (S16: NO), then control goes back to step S15. If the IGSW 24 is turned off in step S16 (S16: YES) (at time t3 in FIG. 4), the engine ECU 20 finishes the engine warming-up process.

In step S2 shown in FIG. 3, the diagnosing apparatus 14 performs an engine rotational speed stabilizing process for stabilizing the engine rotational speed Ne.

Figure 7:
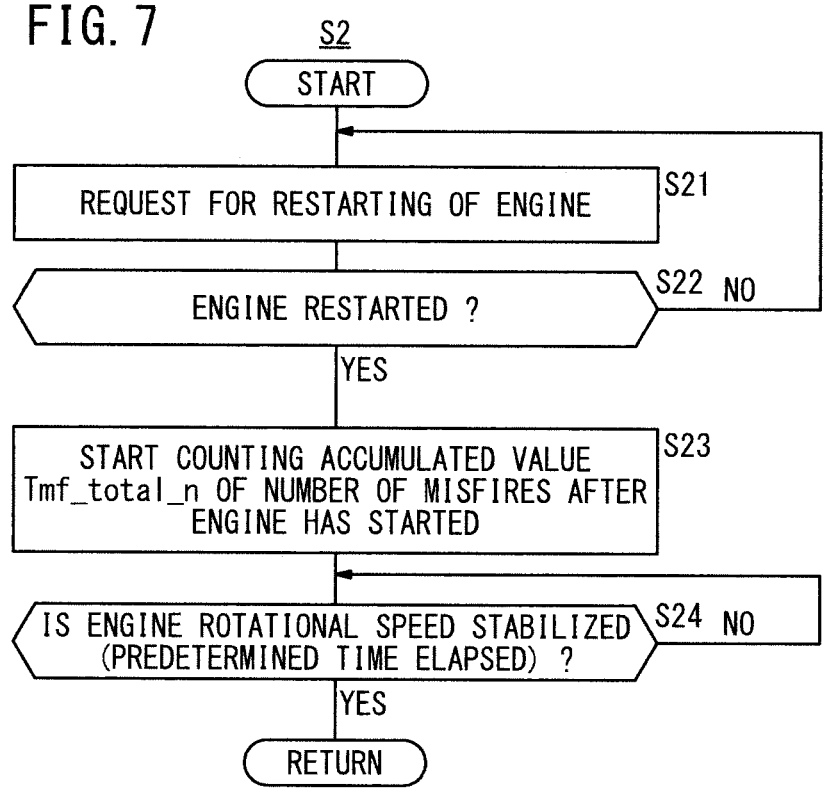
FIG. 7 is a flowchart of an engine rotational speed stabilizing process.

FIG. 7 is a flowchart of the engine rotational speed stabilizing process (details of step S2 shown in FIG. 3). In step S21 shown in FIG. 7, the processor 84 displays, on the display unit 88, a message for prompting the user to restarting the engine 16 to start a malfunction diagnosing process. If the engine 16 is not restarted in step S22 (S22: NO), then control goes back to step S21. If the engine 16 is restarted in step S22 (S22: YES) (at time t4 in FIG. 4), then control goes to step S23.

In step S23, the engine ECU 20 starts counting accumulated values Tmf_total_n [count] representing the numbers of misfires of the respective cylinders 32 after the engine 16 has started to operate. Each of the accumulated values Tmf_total_n has an initial value of zero at the time the engine 16 starts to operate. The "n" in "Tmf_total_n" represents the number of a cylinder 32. For example, "Tmf_total_1" represents an accumulated value of the first cylinder 32a.

Figure 8:
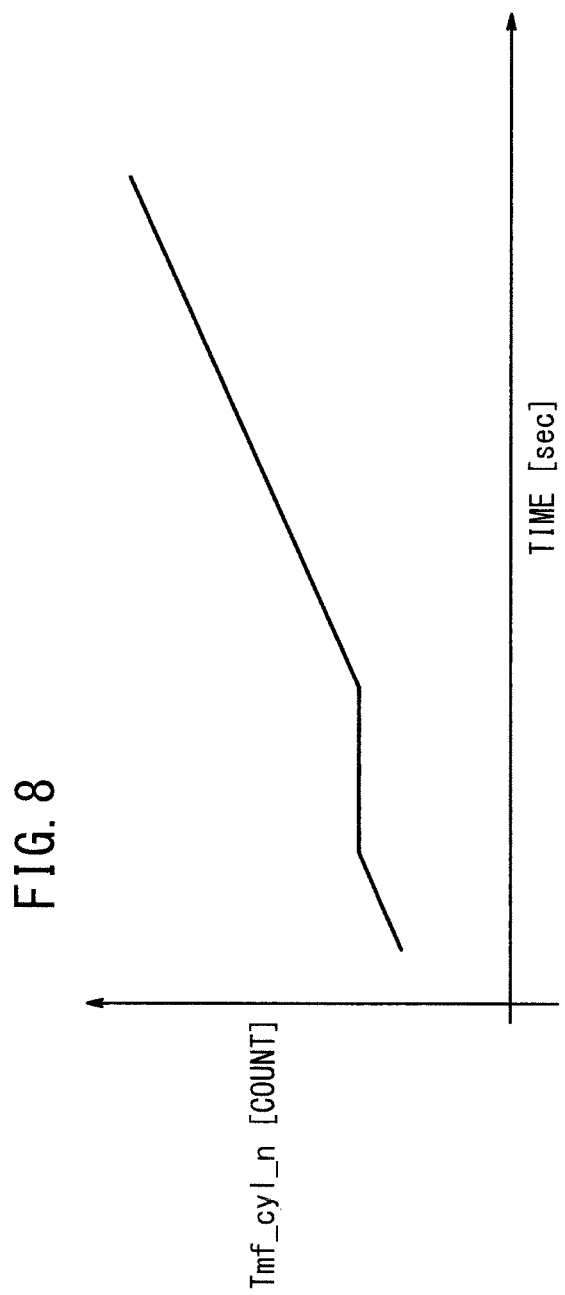
FIG. 8 is a diagram showing an example of accumulated values representing the number of misfires of each cylinder after the engine has started to operate.

As described above, a misfire is detected based on a combination of the output signal from the crankshaft angle sensor 41 and a judgment made by the engine ECU 20. As shown in FIG. 8, the accumulated values Tmf_total_n are counted continuously until there is a request from the diagnosing apparatus 14 to reset the accumulated values Tmf_total_n after the engine 16 has started.

In step S24, the processor 84 judges whether the engine rotational speed Ne is stabilized or not. Specifically, the processor 84 judges whether a predetermined time (e.g., 30 seconds) has elapsed from the restarting of the engine 16 or not in order to judge whether the engine rotational speed Ne is stabilized or not.

If the predetermined time has elapsed (S24: YES) (at time t5 in FIG. 4), advance preparations for the malfunction diagnosing process are completed. After the elapse of the predetermined time, the processor 84 requests the engine ECU 20 to idle the engine 16, and in response to the request, the engine ECU 20 idles the engine 16. At this time, the engine ECU 20 uses both the basic fuel injection control process and the air-fuel ratio FB control process.

In step S3 shown in FIG. 3, the diagnosing apparatus 14 performs a first diagnostic process. The first diagnostic process is a diagnostic process wherein the air-fuel ratio FB control process is discontinued.

Figure 9:
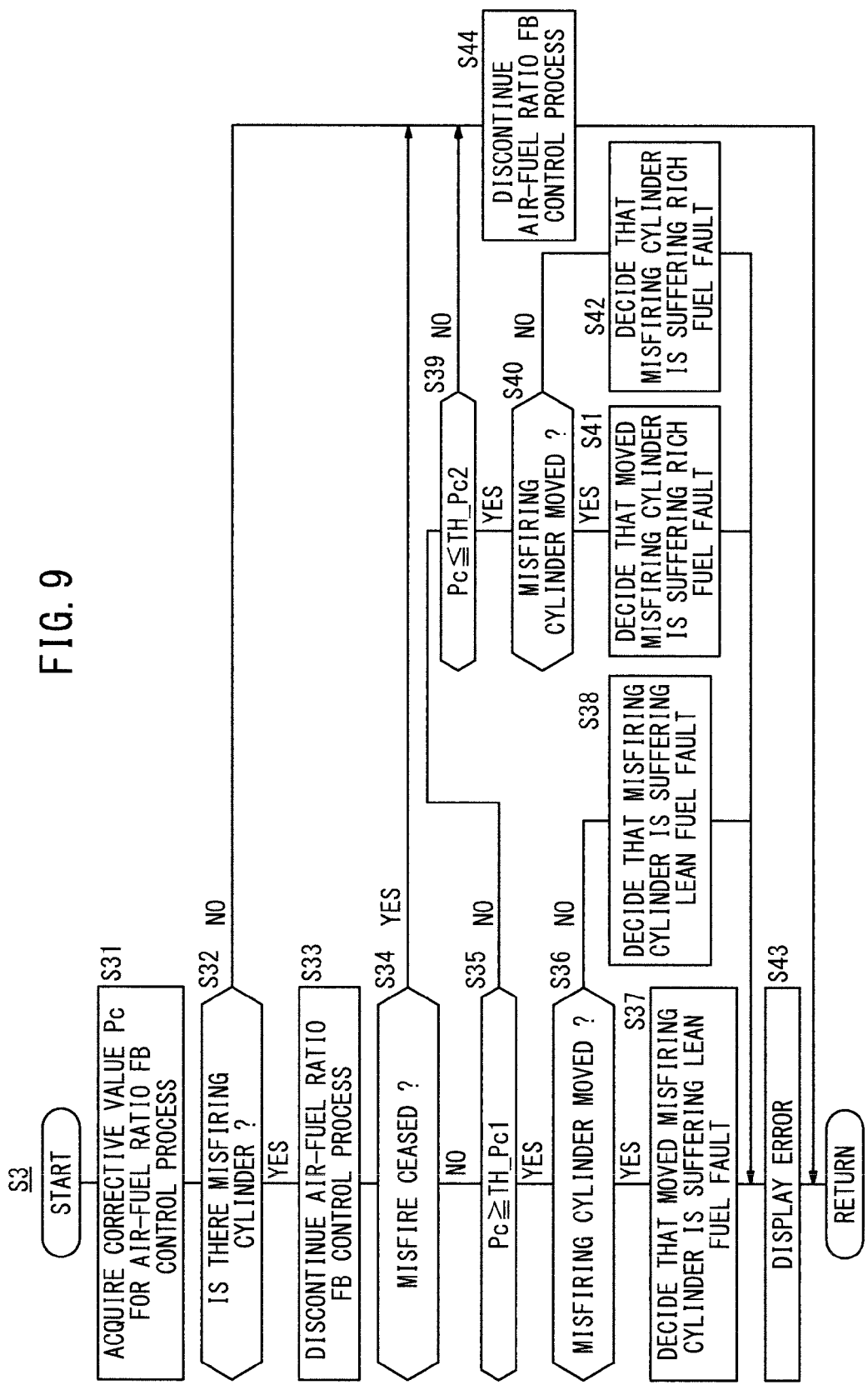
FIG. 9 is a flowchart of a first diagnostic process.

FIG. 9 is a flowchart of the first diagnostic process. When the advance preparations are completed as described above (at time t5 in FIG. 4), the processor 84 of the diagnosing apparatus 14 requests the engine ECU 20 to send the corrective value Pc, and in response to the request, the engine ECU 20 sends the corrective value Pc which is being used in the air-fuel ratio FB control process at present to the diagnosing apparatus 14. The processor 84 now acquires the corrective value Pc in step S31.

The corrective value Pc is a corrective value for changing the total air-fuel ratio Raf_total of the engine 16. In other words, the corrective value Pc is established as the value of a fuel injection ratio Rfi_n, to be described later, corresponding to the difference ΔRaf between the stoichiometric air-fuel ratio and the total air-fuel ratio Raf_total.

In step S32, the processor 84 of the diagnosing apparatus 14 judges whether there is a cylinder which is misfiring among the cylinders 32 (hereinafter referred to as "misfiring cylinder"). Specifically, the processor 84 requests the engine ECU 20 to send the accumulated values Tmf_total_n [count] representing the numbers of misfires of the respective cylinders 32 after the engine 16 has started to operate. In response to the request, the engine ECU 20 sends the accumulated values Tmf_total_n to the processor 84. The processor 84 judges whether each of the individual accumulated values Tmf_total_n exceeds a threshold value TH_total1 (e.g., TH_total1=0) for judging the occurrence of a misfire or not. If the accumulated value Tmf_total_n of a cylinder 32 exceeds the threshold value TH_total1, then the processor 84 decides that the cylinder 32 is misfiring, i.e., there is a misfiring cylinder.

If none of the cylinders 32 are misfiring (S32: NO), then control goes to step S44. If either one of the cylinders 32 is misfiring (S32: YES), then the processor 84 of the diagnosing apparatus 14 requests the engine ECU 20 to discontinue the air-fuel ratio FB control process in step S33. In response to the request, the engine ECU 20 discontinues the air-fuel ratio FB control process and performs the basic fuel injection control process only.

In step S34, the processor 84 of the diagnosing apparatus 14 judges whether the misfire has ceased or not while in the basic fuel injection control process only. Specifically, the processor 84 judges whether or not accumulated values Tmf_total2_n representing the numbers of misfires of the respective cylinders 32 upon elapse of a predetermined time after only the basic fuel injection control process has been involved are equal to or smaller than the threshold value TH_total1. If all of the accumulated values Tmf_total2_n of the respective cylinders 32 are equal to or smaller than the threshold value TH_total1, then the processor 84 decides that the misfire has ceased or not.

If the misfire has ceased as a result of the discontinuation of the air-fuel ratio FB control process (S34: YES), then all the cylinders 32 are said to be normal though the misfire was caused by the air-fuel ratio FB control process. Then, control goes to step S44. If either one of the cylinders 32 misfires and the misfire has not ceased (S34: NO), then control goes to step S35.

In step S35, the processor 84 judges whether or not the corrective value Pc acquired in step S31 is equal to or greater than a threshold value TH_Pc1. The threshold value TH_Pc1 is a threshold value to judge whether the fuel is made excessively rich by the corrective value Pc or not, or to judge whether the fuel is made excessively lean in the absence of the air-fuel ratio FB control process. The threshold value TH_Pc1 may be of +8%, for example.

If the corrective value Pc is equal to or greater than the threshold value TH_Pc1 (S35: YES), then the processor 84 judges whether the misfiring cylinder is moved (changed) by the cease of the air-fuel ratio FB control process or not in step S36. If the misfiring cylinder is moved (S36: YES), then the processor 84 decides that the moved misfiring cylinder is suffering a lean fuel fault in step S37. The lean fuel fault refers to a state wherein though the engine ECU 20 sets a target value for the cylinder air-fuel ratio Raf_n to the stoichiometric air-fuel ratio, i.e., sets the fuel injection quantity Qfi (target value) to a value corresponding to the stoichiometric air-fuel ratio, the actual air-fuel ratio Raf_n of the misfiring cylinder has changed to an excessively lean ratio, or stated otherwise, the misfiring cylinder is suffering a fuel shortage for some reasons.

If the misfiring cylinder is not moved (changed) (S36: NO), then the processor 84 decides that the misfiring cylinder is suffering a lean fuel fault in step S38.

In step S35, if the corrective value Pc is not equal to or greater than the threshold value TH_Pc1 (S35: NO), then the processor 84 judges whether or not the corrective value Pc acquired in step S31 is equal to or smaller than a threshold value TH_Pc2 in step S39. The threshold value TH_Pc2 is a threshold value to judge whether the fuel is made excessively lean by the corrective value Pc or not, or to judge whether the fuel is made excessively rich in the absence of the air-fuel ratio FB control process. The threshold value TH_Pc2 may be of −8%, for example.

If the corrective value Pc is not equal to or smaller than the threshold value TH_Pc2 (S39: NO), then control goes to step S44. If the corrective value Pc is equal to or smaller than the threshold value TH_Pc2 (S39: YES), then the processor 84 of the diagnosing apparatus 14 judges whether the misfiring cylinder is moved (changed) by the cease of the air-fuel ratio FB control process or not in step S40. If the misfiring cylinder is moved (S40: YES), then the processor 84 decides that the moved misfiring cylinder is suffering a rich fuel fault in step S41. The rich fuel fault refers to a state wherein though the engine ECU 20 sets a target value for the cylinder air-fuel ratio Raf_n to the stoichiometric air-fuel ratio, i.e., sets the fuel injection quantity Qfi (target value) to a value corresponding to the stoichiometric air-fuel ratio, the actual air-fuel ratio Raf_n of the misfiring cylinder has changed to an excessively rich ratio, or stated otherwise, the misfiring cylinder is being supplied with excessive fuel for some reasons.

If the misfiring cylinder is not moved (changed) (S40: NO), then the processor 84 of the diagnosing apparatus 14 decides that the misfiring cylinder is suffering a rich fuel fault in step S42.

After steps S37, S38, S41, S42, the processor 84 of the diagnosing apparatus 14 displays details of the malfunction on the display unit 88, i.e., displays an error on the display unit 88 in step S43.

If none of the cylinders 32 are misfiring in step S32 (S32: NO), or if the misfire has ceased in step S34 (S34: YES), or if the corrective value Pc is not equal to or smaller than the threshold value TH_Pc2 in step S39 (S39: NO), no malfunction of the cylinders 32 can be detected. In this case, the air-fuel ratio FB control process is discontinued in step S44, as in step S33, after which the first diagnostic process is finished (at time t6 in FIG. 4).

In step S4 in FIG. 3, the processor 84 of the diagnosing apparatus 14 judges whether the identification of a malfunctioning cylinder is finished or not. The identification of a malfunctioning cylinder is finished when either one of steps S37, S38, S41, S42 shown in FIG. 9 has been carried out. If the identification of a malfunctioning cylinder is finished (S4: YES), then the present malfunction diagnosing process is brought to an end. If the identification of a malfunctioning cylinder is not finished (S4: NO), then control goes to step S5.

In step S5, the diagnosing apparatus 14 performs a second diagnostic process (at time t6 in FIG. 4). The second diagnostic process is a diagnostic process for switching (changing) the air-fuel ratios Raf_n of the respective cylinders 32. Specifically, the second diagnostic process is a diagnostic process for switching (changing) corrective values [%] for changing the air-fuel ratios Raf_n of the respective cylinders 32 (hereinafter referred to as "cylinder corrective values Cfi_n" or "corrective values Cfi_n").

Each of the corrective values Cfi_n is used to define the ratio (hereinafter referred to as "cylinder fuel injection ratio Rfi_n" or "fuel injection ratio Rfi_n") of a target value for the fuel injection quantity Qfi to the fuel injection quantity Qfi (basic cylinder fuel injection quantity) for equalizing the cylinder air-fuel ratio Raf_n to the stoichiometric air-fuel ration in relation to the intake air quantity Qaf in the basic fuel injection control process. The sum of 100% (corresponding to the basic cylinder fuel injection quantity) and the corrective value Cfi_n serves as the fuel injection ratio Rfi_n (Rfi_n=100+Cfi_n).

The "n" in "Cfi_n" and "Rfi_n" represents the number of a cylinder 32.

For example, "Cfi_1" represents the corrective value Cfi_n of the first cylinder 32a, and "Rfi_1" represents the fuel injection ratio Rfi_n of the first cylinder 32a.

When the first diagnostic process is finished, the air-fuel ratio FB control process has ceased (see S33, S44 in FIG. 9). When the second diagnostic process is started, therefore, only the basic fuel injection control process has been performed.

Figure 10:
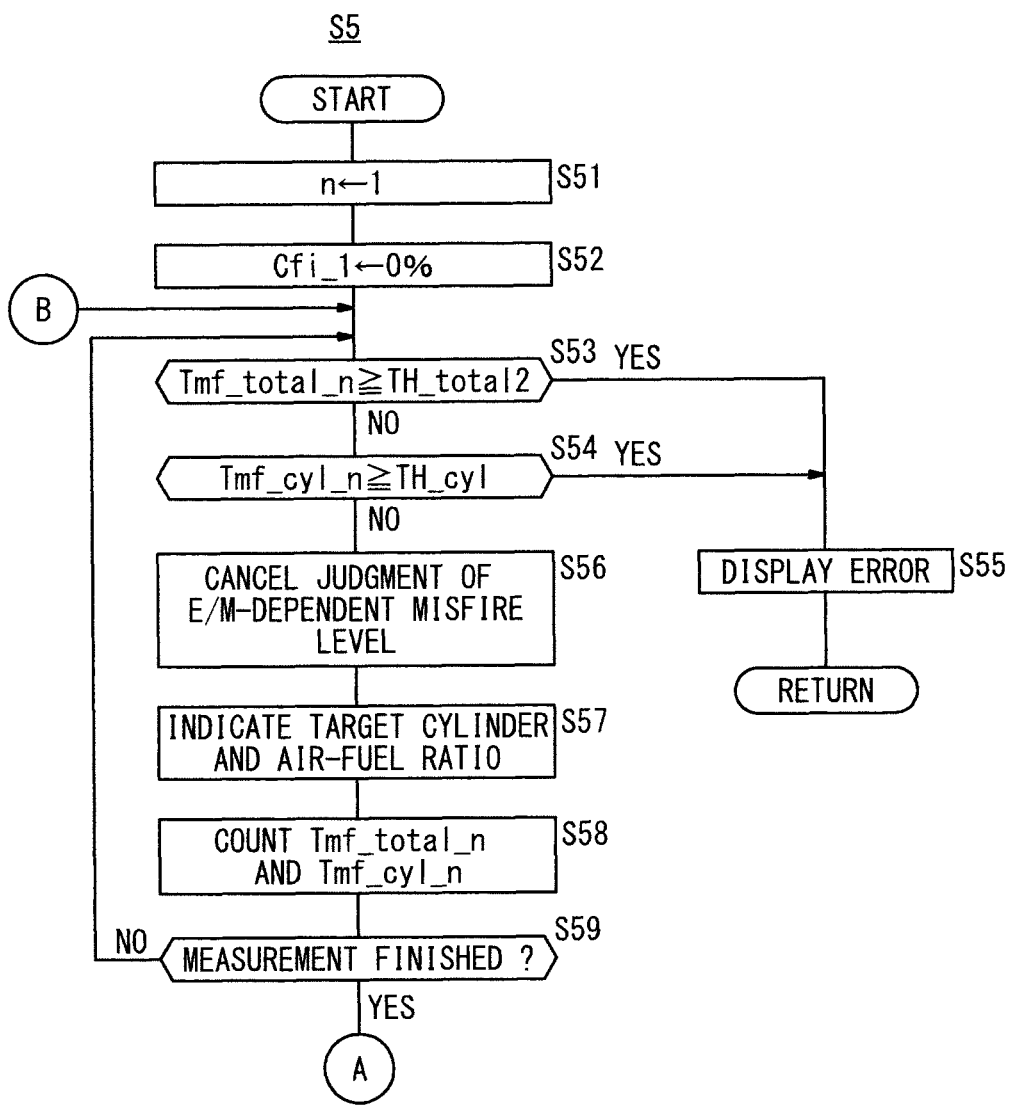
FIG. 10 is a first flowchart of a second diagnostic process.
Figure 11:
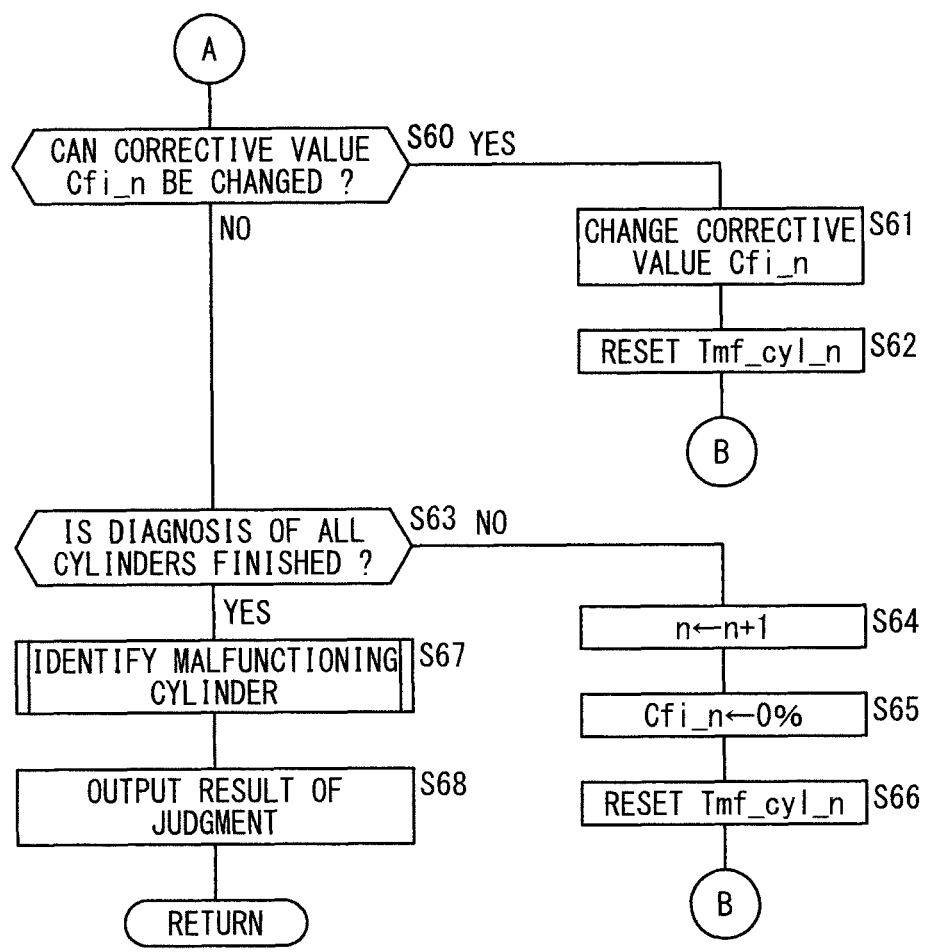
FIG. 11 is a second flowchart of the second diagnostic process.

FIGS. 10 and 11 are flowcharts of the second diagnostic process. When the second diagnostic process shown in FIGS. 10 and 11 is carried out, waveform data shown in FIG. 5 are acquired.

In steps S51, S52, the processor 84 of the diagnosing apparatus 14 performs an initializing process. Specifically, in step S51, the processor 84 sets the variable n, which represents a cylinder 32 (hereinafter referred to as "target cylinder") for which the cylinder corrective value Cfi_n is to be switched, to 1. When n=1, it indicates the first cylinder 32a, and when n=2, it indicates the second cylinder 32b. When n=3, it indicates the third cylinder 32c, and when n=4, it indicates the fourth cylinder 32d. Therefore, since the variable n is set 1 in step S51, the first cylinder 32a will serve as the target cylinder in the second diagnostic process. In step S52, the processor 84 sets the corrective value Cfi_1 of the first cylinder 32a to 0% (Cfi_1←0%). Stated otherwise, the fuel injection ratio Rfi_1 of the first cylinder 32a is set to 100% for achieving the stoichiometric air-fuel ratio (Rfi_1←100%).

In steps S53, S54, the processor 84 of the diagnosing apparatus 14 judges whether the exhaust gas filter is overheated or not. Specifically, the processor 84 judges in step S53 whether or not each of the accumulated values Tmf_total_n representing the number of misfires of the target cylinder after the engine 16 has started to operate is equal to or greater than a threshold value TH_total2 [count]. The threshold value TH_total2 is a threshold value to judge the overheating of the exhaust gas filter 18. Since the accumulated value Tmf_total_n is counted by the engine ECU 20 from the time when the engine started to operate, the processor 84 acquires each of the accumulated values Tmf_total_n from the engine ECU 20.

If the accumulated value Tmf_total_n of the target cylinder is smaller than the threshold value TH_total2 (S53: NO), then the processor 84 judges in step S54 whether or not an accumulated value Tmf_cyl_n [count] representing the number of misfires of the target cylinder in a measurement period Pm [sec] is equal to or greater than a threshold value TH_cyl [count]. The measurement period Pm refers to a period to switch the corrective value Cfi_n (i.e., to switch the fuel injection ratio Rfi_n and the cylinder air-fuel ratio Raf_n) (see FIGS. 5 and 12). Therefore, the accumulated value Tmf_cyl_n is an accumulated value representing the number of misfires of the target cylinder each time the corrective value Cfi_n is switched. The threshold value TH_cyl is a threshold value to judge the overheating of the exhaust gas filter 18.

Figure 12:
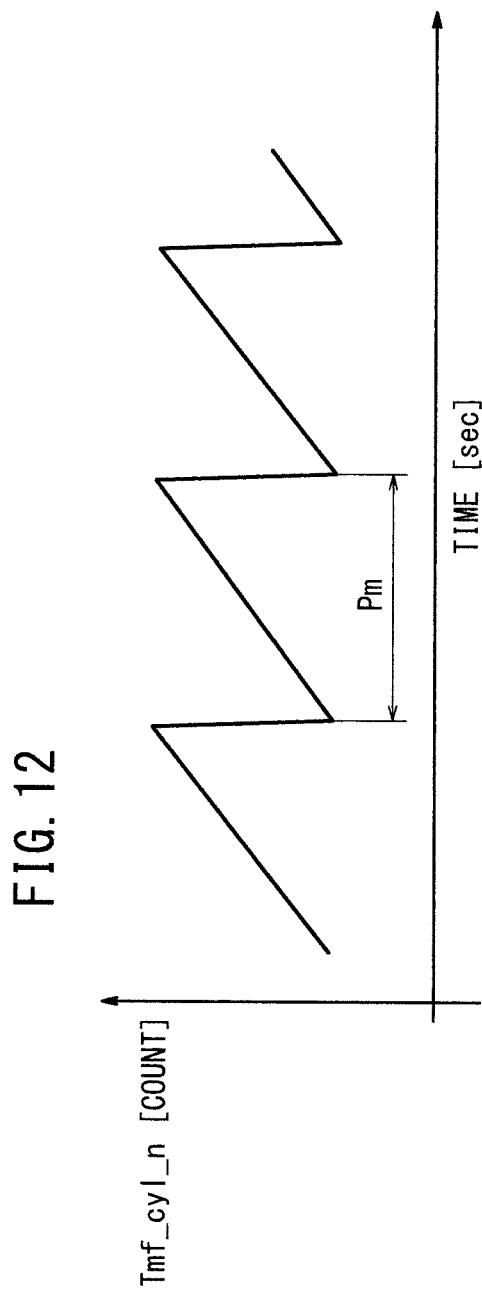
FIG. 12 is a diagram showing an example of accumulated values representing the number of misfires in each measurement period.

The accumulated value Tmf_cyl_n is counted by the processor 84 of the diagnosing apparatus 14. Specifically, based on a command from the diagnosing apparatus 14, each time a cylinder 32 misfires, the engine ECU 20 indicates the number of the cylinder 32 and the occurrence of the misfire to the diagnosing apparatus 14. As shown in FIGS. 5 and 12, the diagnosing apparatus 14 which has received the number of the cylinder 32 and the occurrence of the misfire counts the number of misfires in each measurement period Pm.

If the accumulated value Tmf_cyl_n is smaller than the threshold value TH_cyl (S54: NO), then control goes to step S56. If the accumulated value Tmf_total_n of the target cylinder is equal to or greater than the threshold value TH_total2 (S53: YES) or if the accumulated value Tmf_cyl_n is equal to or greater than the threshold value TH_cyl (S54: YES), then the processor 84 displays an error on the display unit 88 in step S55. Specifically, since the number of misfires is large, the processor 84 displays a message indicating that the malfunction diagnosing process should be interrupted in order to cool down the filter 18 on the display unit 88, and cancels the second diagnostic process. Based on the displayed error, the user temporarily interrupts the second diagnostic process, letting the temperature of the filter 18 to decrease for making it possible to resume the second diagnostic process. When the malfunction diagnosing process (FIG. 3) is to be resumed, each of the accumulated values Tmf_total_n is reset based on an action made by the user on the input/output unit 80.

In step S56, the processor 84 cancels the judgment of an emission (E/M)-dependent misfire level. The E/M-dependent misfire level refers to the magnitude of the number of misfires caused by soot deposited on the ignition plugs 36. According to the present embodiment, the processor 84 gives priority to the judgment of a misfire for the protection of the filter 18 (S53, S54 shown in FIG. 10) by canceling the judgment of an E/M-dependent misfire level. However, it is possible to continue the judgment of an E/M-dependent misfire level in the second diagnostic process.

In step S57 through S67, the processor 84 identifies a malfunctioning cylinder. Specifically, according to the present embodiment, as shown in FIG. 5, the four cylinders 32 are successively selected as an object to be diagnosed. As described above, a cylinder 32 to be diagnosed is referred to as "target cylinder". With respect to three out of the four cylinders 32, except the target cylinder, the basic fuel injection control process is carried out with the corrective value Cfi_n being set to 0%. With respect to the target cylinder, the corrective value Cfi_n is changed stepwise. Specifically, the corrective value Cfi_n is switched successively to ±0%, −10%, −20%, −30%, and 40%. Stated otherwise, the fuel injection ratio Rfi_n is lowered successively to 100% (stoichiometric air-fuel ratio), 90%, 80%, 70%, and 60%, thereby changing the cylinder air-fuel ratio Raf_n.

In order to carry out the above processing sequence, in step S57, the processor 84 indicates, to the engine ECU 20, the variable n and the corrective value Cfi_n for the target cylinder that is indicated by the variable n in every expansion stroke or every set of a plurality of expansion strokes. The engine ECU 20 which has received the variable n and the corrective value Cfi_n carries out a given number of expansion strokes in the target cylinder with the corrective value Cfi_n. According to the present embodiment, step S57 is repeated to perform 50 expansion strokes at each corrective value Cfi_n (i.e., at each fuel injection ratio Rfi_n or each cylinder air-fuel ratio Raf_n).

While the engine ECU 20 is performing expansion strokes, the processor 84 counts an accumulated value Tmf_total_n and an accumulated value Tmf_cyl_n in step S58. Specifically, each time the engine ECU 20 detects a misfire, it indicates the misfire to the processor 84. In response to the indication of the misfire, the processor 84 counts an accumulated value Tmf_total_n and an accumulated value Tmf_cyl_n.

In steps S62, S66 to be described later, the accumulated value Tmf_cyl_n is reset each time the cylinder air-fuel ratio Raf_n is changed. Therefore, the accumulated value Tmf_cyl_n is accumulated in each cylinder corrective value Cfi_n (i.e., in each measurement period Pm), as shown in FIGS. 5 and 12.

In step S59, the processor 84 judges whether the measurement in the present measurement period Pm is finished or not, i.e., whether 50 expansion strokes have been performed in the target cylinder at the cylinder corrective value Cfi_n or not. The processor 84 may judge whether the measurement in the present measurement period Pm is finished or not by receiving the output signal from the crankshaft angle sensor 41 through the engine ECU 20 and detecting the rotational speed of the crankshaft 40 based on the received output signal. If the measurement in the present measurement period Pm is not finished (S59: NO), then control returns to step S53. If the measurement in the present measurement period Pm is finished (S59: YES), then control goes to step S60 shown in FIG. 11.

In step S60 in FIG. 11, the processor 84 judges whether the corrective value Cfi_n can be changed for the same target cylinder or not, i.e., whether an unmeasured corrective value Cfi_n is left for the same target cylinder or not. Specifically, according to the present embodiment, as described above, since the corrective value Cfi_n is changed successively to ±0%, −10%, −20%, −30%, and −40%, the corrective value Cfi_n can be changed if the present corrective value Cfi_n is not −40%.

If the corrective value Cfi_n can be changed (S60: YES), then the processor 84 stores the accumulated value Tmf_cyl_n depending on the cylinder 32 and the fuel injection ratio Rfi_n (see FIGS. 15 through 18), and thereafter changes the corrective value Cfi_n for the same target cylinder in step S61. Specifically, if the present corrective value Cfi_n for the target cylinder is ±0%, then the processor 84 changes the corrective value Cfi_n to 10%. If the present corrective value Cfi_n for the target cylinder is −10%, then the processor 84 changes the corrective value Cfi_n to −20%. If the present corrective value Cfi_n for the target cylinder is −20%, then the processor 84 changes the corrective value Cfi_n to −30%. If the present corrective value Cfi_n for the target cylinder is 30%, then the processor 84 changes the corrective value Cfi_n to −40%. In step S62, the processor 84 resets the accumulated value Tmf_cyl_n. Control then goes back to step S53 shown in FIG. 10.

If the corrective value Cfi_n cannot be changed (S60: NO), i.e., if the present corrective value Cfi_n for the target cylinder is −40%, then the processor 84 resets the corrective value Cfi_n, and stores the accumulated value Tmf_cyl_n depending on the cylinder 32 and the fuel injection ratio Rfi_n (see FIGS. 15 through 18). Thereafter, in step S63, the processor 84 judges whether the diagnosis of all the cylinders 32 is finished or not. If the diagnosis of some cylinders 32 is not finished (S63: NO), then the processor 84 adds 1 to the present value of the variable n for identifying a target cylinder to produce a new variable n (n←n+1) in step S64, thereby switching from the present target cylinder to a new target cylinder (at times t11, t12, t13 in FIG. 5).

In step S65, the processor 84 substitutes 0 in the corrective value Cfi_n of the new target cylinder. The new target cylinder thus starts to operate at the stoichiometric air-fuel ratio (±0%). Then, in step S66, the processor 84 resets the accumulated value Tmf_cyl_n. Control then goes back to step S53.

If the diagnosis of all the cylinders 32 is finished in step S63 (S63: YES) (at time t7 in FIG. 5), then in step S67 the processor 84 judges whether each of the cylinders 32 is malfunctioning or not and identifies the type of a malfunction if a cylinder 32 is malfunctioning, based on the accumulated value Tmf_cyl_n representing the number of misfires of each of the cylinders 32, which was acquired in the corresponding step.

Figure 13:
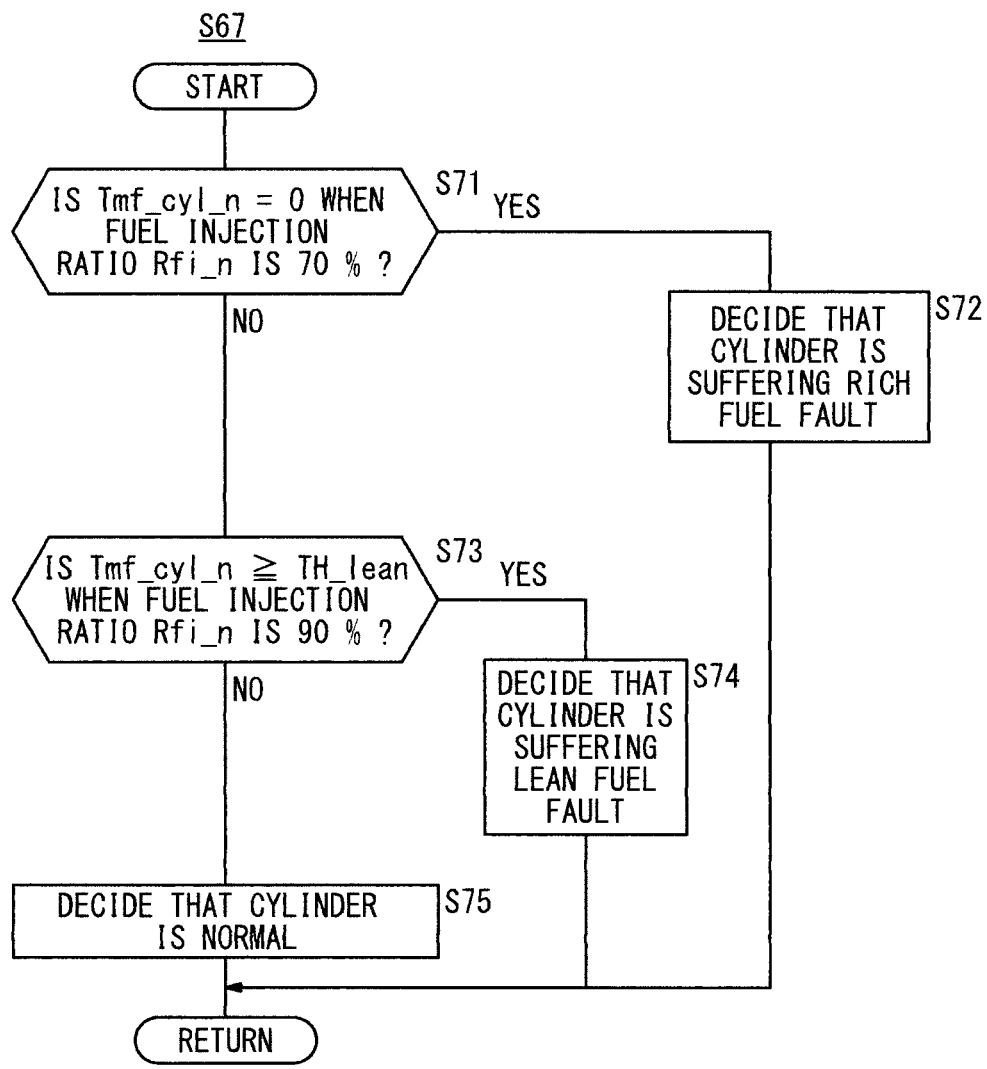
FIG. 13 is a flowchart of a process for judging whether each cylinder is malfunctioning or not and identifying the type of a malfunction if a cylinder is malfunctioning, in the second diagnostic process.
Figure 14:
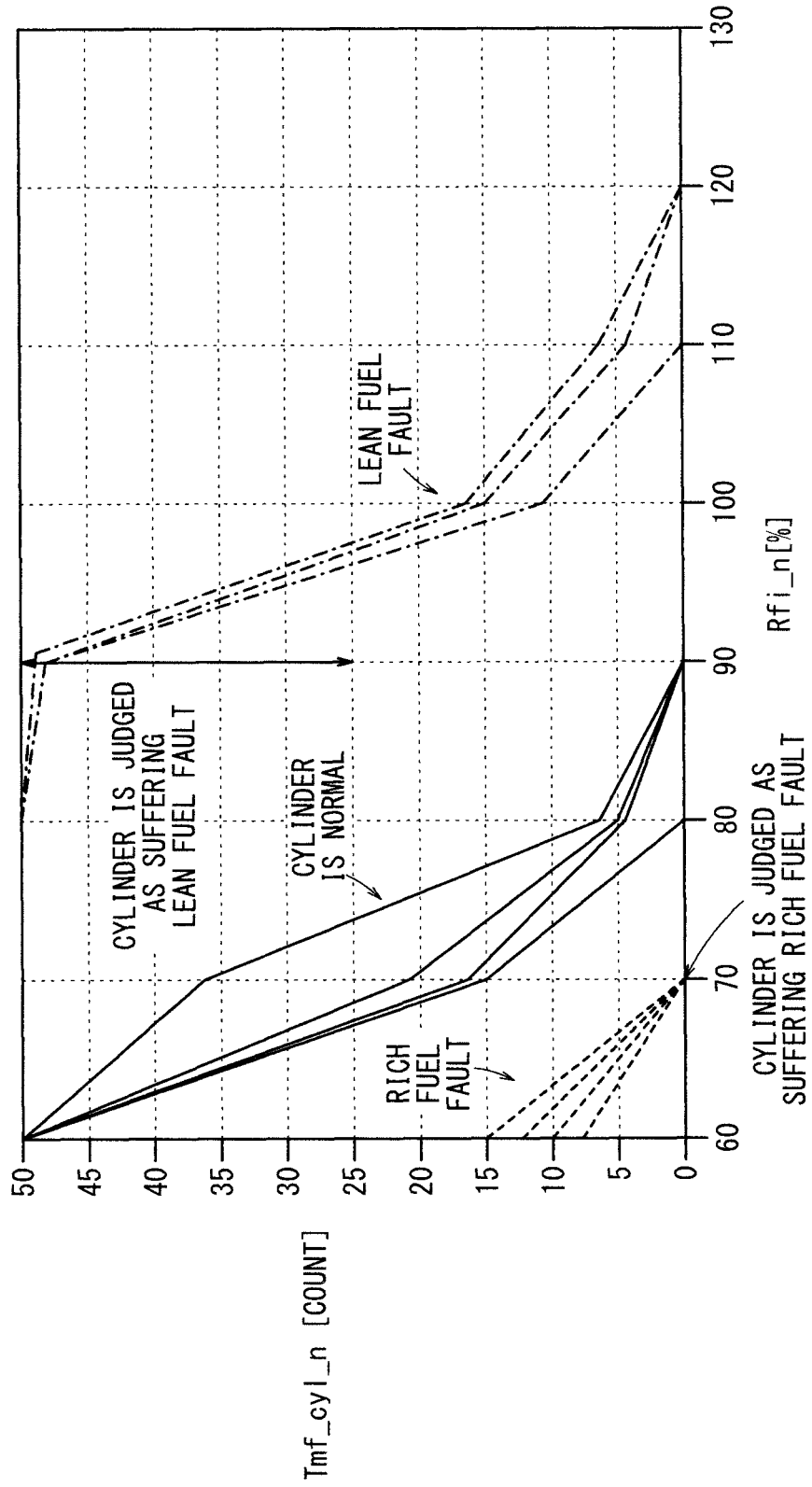
FIG. 14 is a diagram which is illustrative of the process for judging whether each cylinder is malfunctioning or not and identifying the type of a malfunction if a cylinder is malfunctioning, in the second diagnostic process.

FIG. 13 is a flowchart (details of S67 in FIG. 11) of a process for judging whether each cylinder 32 is malfunctioning or not and identifying the type of a malfunction if a cylinder 32 is malfunctioning, in the second diagnostic process. The process shown in FIG. 13 is carried out on each of the cylinders 32. FIG. 14 is a diagram which is illustrative of the process for judging whether each cylinder 32 is malfunctioning or not and identifying the type of a malfunction if a cylinder 32 is malfunctioning, in the second diagnostic process.

In step S71 shown in FIG. 13, the processor 84 of the diagnosing apparatus 14 judges whether the accumulated value Tmf_cyl_n representing the number of misfires of a cylinder 32 at the time the fuel injection ratio Rfi_n is 70%, i.e., the corrective value Cfi_n is −30%, is zero or not. If the accumulated value Tmf_cyl_n at the time the fuel injection ratio Rfi_n is 70% is zero (S71: YES), then the processor 84 decides that the cylinder 32 is suffering a rich fuel fault in step S72. As described above, the rich fuel fault refers to a state wherein the cylinder 32 is being supplied with excessive fuel for some reasons. If the accumulated value Tmf_cyl_n at the time the fuel injection ratio Rfi_n is 70% is not zero (S71: NO), then control goes to step S73.

In step S73, the processor 84 judges whether or not the accumulated value Tmf_cyl_n representing the number of misfires of the cylinder 32 at the time the fuel injection ratio Rfi_n is 90%, i.e., the corrective value Cfi_n is −10%, is equal to or greater than a threshold value TH_lean [count]. The threshold value TH_lean is a threshold value for judging a lean fuel fault. According to the present embodiment, the threshold value TH_lean represents a count of 25. If the accumulated value Tmf_cyl_n at the time the fuel injection ratio Rfi_n is 90% is equal to or greater than the threshold value TH_lean (S73: YES), then the processor 84 decides that the cylinder 32 is suffering a lean fuel fault in step S74. As described above, the lean fuel fault refers to a state wherein the misfiring cylinder is suffering a fuel shortage for some reasons. If the accumulated value Tmf_cyl_n at the time the fuel injection ratio Rfi_n is 90% is not equal to or greater than the threshold value TH_lean (S73: NO), then the processor 84 decides that the cylinder 32 is normal in step S75.

According to the judging process described above, it is possible to judge whether each of the cylinders 32 is normal or suffering from a rich fuel fault or a lean fuel fault, as shown in FIG. 14. The result of the above judging process is converted into a file having a predetermined format (from time t7 to time t8 in FIG. 4), and is displayed on the display unit 88 (from time t8 to time t9 in FIG. 4).

The judging process shown in FIG. 13 does not use the values at the time the fuel injection ratio Rfi_n is 100%, 80%, and 60%, i.e., at the time the corrective value Cfi_n is ±0%, −20%, and −40%. The data at these fuel injection ratios Rfi_n will be used for analysis by the user after the processor 84 has judged a malfunction.

In step S68 shown in FIG. 11, the processor 84 outputs the result of the judging process of step S67 to the display unit 88.

FIGS. 15 through 18 are diagrams showing respective data tables 100, 110, 120, 130 of accumulated values Tmf_cyl_n representing the numbers of misfires which are acquired by the diagnosing apparatus 14, respective graphs 102, 112, 122, 132 based on the data tables 100, 110, 120, 130, and respective screens 104, 114, 124, 134 that are displayed on the display unit 88.

Figure 15:
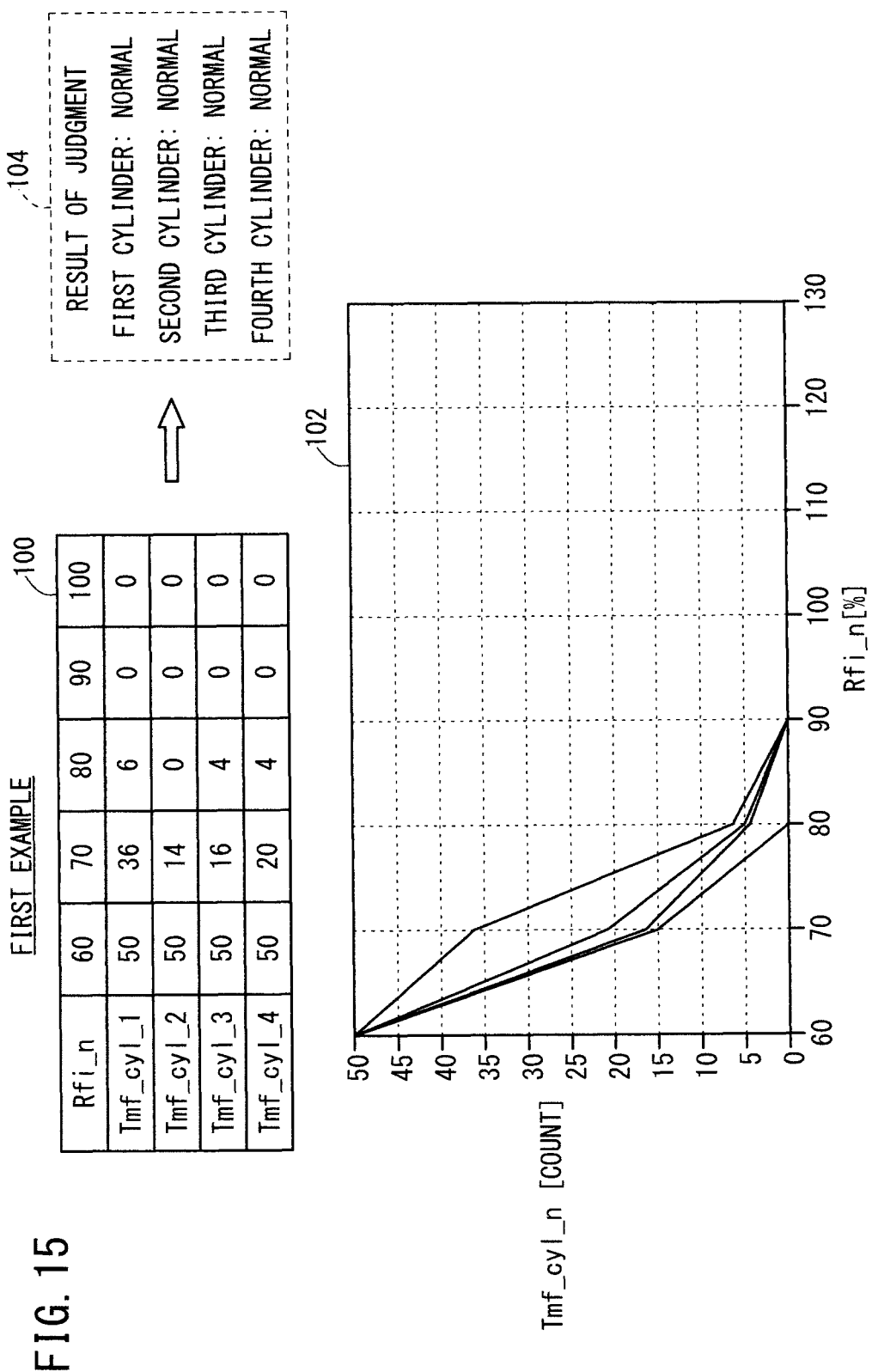
FIG. 15 is a diagram showing a data table of accumulated values representing the number of misfires which are acquired by the internal combustion engine diagnosing apparatus, a graph based on the data table, and a first example of a screen that is displayed on a display unit of the internal combustion engine diagnosing apparatus.
Figure 16:
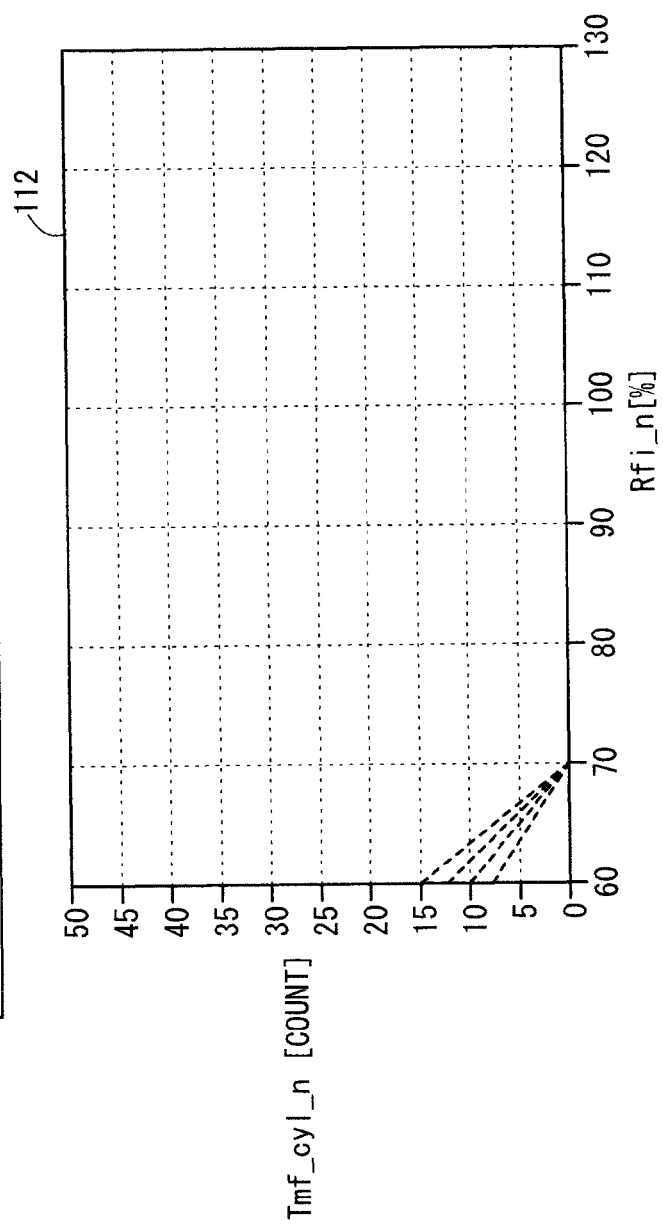
FIG. 16 is a diagram showing a data table of accumulated values representing the number of misfires which are acquired by the internal combustion engine diagnosing apparatus, a graph based on the data table, and a second example of a screen that is displayed on the display unit of the internal combustion engine diagnosing apparatus.
Figure 17:
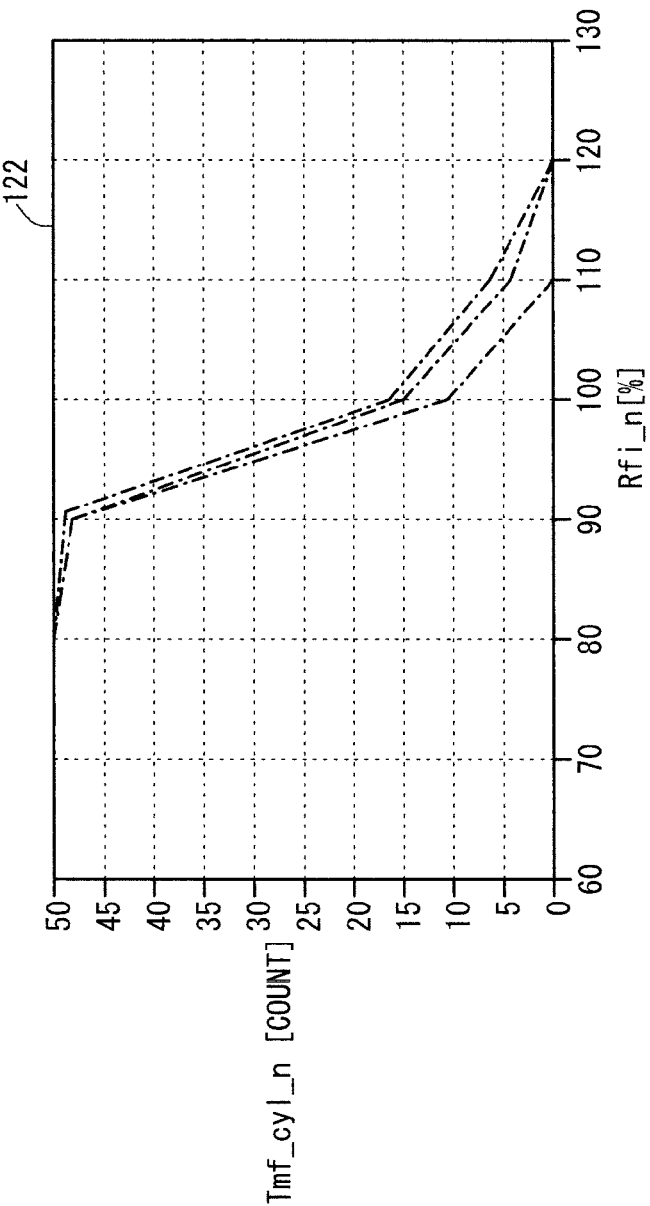
FIG. 17 is a diagram showing a data table of accumulated values representing the number of misfires which are acquired by the internal combustion engine diagnosing apparatus, a graph based on the data table, and a third example of a screen that is displayed on the display unit of the internal combustion engine diagnosing apparatus.

FIG. 15 shows the data table 100, the graph 102, and the screen 104 at the time each of the cylinders 32 is normal. FIG. 16 shows the data table 110, the graph 112, and the screen 114 at the time each of the cylinders 32 is suffering a rich fuel fault. FIG. 17 shows the data table 120, the graph 122, and the screen 124 at the time each of the cylinders 32 is suffering a lean fuel fault. FIG. 18 shows the data table 130, the graph 132, and the screen 134 at the time the first cylinder 32a and the third cylinder 32c are normal, the second cylinder 32b is suffering a rich fuel fault, and the fourth cylinder 32d is suffering a lean fuel fault.

The graphs 122, 132 shown in FIGS. 17 and 18 include data produced when the fuel injection ratio Rfi_n is in excess of 100%. Those data are added for illustrative purposes only.

3. Advantages of the Present Embodiment

According to the present embodiment, as described above, it is possible to identify, highly accurately and simply, a malfunctioning cylinder, which may be suffering a rich fuel fault or a leaf fuel malfunction, whose cylinder air-fuel ratio Raf_n is abnormal.

Generally, the actual cylinder air-fuel ratio Raf_n of a normal cylinder 32, which changes depending on the fuel injection quantity Qfi, is substantially the same as a target value for the cylinder air-fuel ratio Raf_n depending on the corrective value Cfi_n, and the relationship between the air-fuel ratio Raf_n of each cylinder 32 and the occurrence of a misfire is determined to a certain extent depending on the configuration of the engine 16. For example, when the actual cylinder air-fuel ratio Raf_n is equal to the stoichiometric air-fuel ratio, essentially no misfire occurs. However, as the actual cylinder air-fuel ratio Raf_n changes to a richer ratio or a leaner ratio, it is more likely to cause a misfire. According to the present embodiment, the cylinder air-fuel ratio Raf_n (the fuel injection ratio Rfi_n and the corrective value Cfi_n) is changed stepwise, and the accumulated value Tmf_cyl_n representing the number of misfires is counted to determine a combustible fuel injection range for detecting a failure of the cylinder air-fuel ratio Raf_n. Consequently, it is easy to detect a failure of the cylinder air-fuel ratio Raf_n, making it possible to identify a malfunctioning cylinder highly accurately.

It is customary to control the cylinder air-fuel ratio Raf_n on the engine 16, and the accumulated value Tmf_cyl_n representing the number of misfires can be counted by the crankshaft angle sensor 41 and the engine ECU 20, for example. Therefore, the cylinder air-fuel ratio Raf_n can be controlled and the accumulated value Tmf_cyl_n representing the number of misfires can be counted, using the existing configuration of the engine 16. According to the present embodiment, a malfunctioning cylinder is identified from the relationship between the cylinder air-fuel ratio Raf_n (the fuel injection ratio Rfi_n) and the accumulated values Tmf_cyl_n representing the numbers of misfires of the cylinders 32. Therefore, it is possible to identify a malfunctioning cylinder simply by using the cylinder air-fuel ratio Raf_n (the fuel injection ratio Rfi_n) and the accumulated values Tmf_cyl_n representing the numbers of misfires, which can be controlled or judged using the existing configuration of the engine 16.

The processor 84 of the diagnosing apparatus 14 controls the fuel injection quantities Qfi (the corrective values Cfi_n), successively one by one, of the cylinders 32 for reducing the cylinder air-fuel ratio Raf_n stepwise (see FIG. 5) while the engine 16 is idling with no load imposed thereon. Since this allows a cylinder malfunction to be confirmed for the cylinders 32 one by one, a malfunctioning cylinder can be judged more accurately.

The processor 84 reduces the corrective value Cfi_n stepwise from 0% thereby to reduce the fuel injection ratio Rfi_n stepwise from 100% (see FIG. 5).

As the stoichiometric air-fuel ratio at which the accumulated value Tmf_cyl_n representing the numbers of misfires is substantially zero changes to a leaner air-fuel ratio at which the accumulated value Tmf_cyl_n representing the numbers of misfires increases, a malfunctioning cylinder can accurately be judged, and any adverse effect that the occurrence of misfires has on the ignition plug 36 or the filter 18 is held to a minimum.

Specifically, when misfires occur frequently in a cylinder 32, the temperature in the combustion chamber 46 of the cylinder 32 drops, tending to smoke the ignition plug 36, i.e., depositing more soot on the ignition plug 36. As a result, it is highly likely for the cylinder 32 to cause more misfires due to the deposited soot, and it may not be possible to judge accurately the accumulated value Tmf_cyl_n representing the number of misfires which are caused by a change in the cylinder air-fuel ratio Raf_n (the corrective value Cfi_n). The soot deposited on the ignition plug 36 may possibly adversely affect the durability of the ignition plug 36. When misfires occur, unburned gases which have not been combusted in the combustion chamber 46 are discharged from the engine 16, and then may be ignited in the filter 18 by the heat thereof. If this phenomenon happens frequently, the durability of the filter 18 may possibly be adversely affected. According to the present embodiment, the combustion chamber 46 gradually changes from a normally combusting state to a more misfiring state, the drop in the temperature in the combustion chamber 46 is minimized, thereby preventing the above deficiencies from taking place.

According to the present embodiment, when the fuel injection ratio Rfi_n is 70%, i.e., the corrective value Cfi_n is −30%, if there is a cylinder 32 whose accumulated value Tmf_cyl_n representing the number of misfires is zero, then the processor 84 of the diagnosing apparatus decides that the cylinder 32 is suffering from a rich fuel fault, i.e., it is supplied with excessive fuel. Accordingly, a rich fuel fault can simply be judged.

According to the present embodiment, when the fuel injection ratio Rfi_n is 90%, i.e., the corrective value Cfi_n is −10%, if there is a cylinder 32 whose accumulated value Tmf_cyl_n representing the number of misfires is 25 or greater, then the processor 84 of the diagnosing apparatus 14 decides that the cylinder 32 is suffering from a lean fuel fault, i.e., it is short of fuel. Accordingly, a lean fuel fault can simply be judged.

According to the present embodiment, if the accumulated value Tmf_total_n representing the number of misfires exceeds the threshold value TH_total2 or the accumulated value Tmf_cyl_n representing the number of misfires exceeds the threshold value TH_cyl while the corrective value Cfi_n, i.e., the fuel injection ratio Rfi_n or the cylinder air-fuel ratio Raf_n, is being changed stepwise, the corrective value Cfi_n is caused to stop being changed stepwise. Therefore, it is possible to prevent the ignition plug 36 or the filter 18 from being adversely affected depending on the above threshold values. For preventing the ignition plug 36 from being adversely affected, when the second diagnostic process is resumed, both the basic fuel injection control process and the air-fuel ratio FB control process are carried out before the corrective value Cfi_n is changed stepwise, thereby burning out the soot deposited on the ignition plug 36.

According to the present embodiment, the processor 84 of the diagnosing apparatus 14 counts the accumulated value Tmf_cyl_n representing the number of misfires of a target cylinder in each measurement period Pm. Consequently, it is possible to judge a failure of the accumulated value Tmf_cyl_n for each corrective value Cfi_n, i.e., each fuel injection ratio Rfi_n or each cylinder air-fuel ratio Raf_n, making it possible to appropriately detect a misfire as a malfunction at the time a malfunctioning cylinder is identified.

According to the present embodiment, even if there is no problem about the controlling of the total air-fuel ratio Raf_total of the engine 16, it is possible to detect a deficiency of the controlling of the air-fuel ratio Raf_n which may have occurred in the individual cylinders 32.

Figure 19:
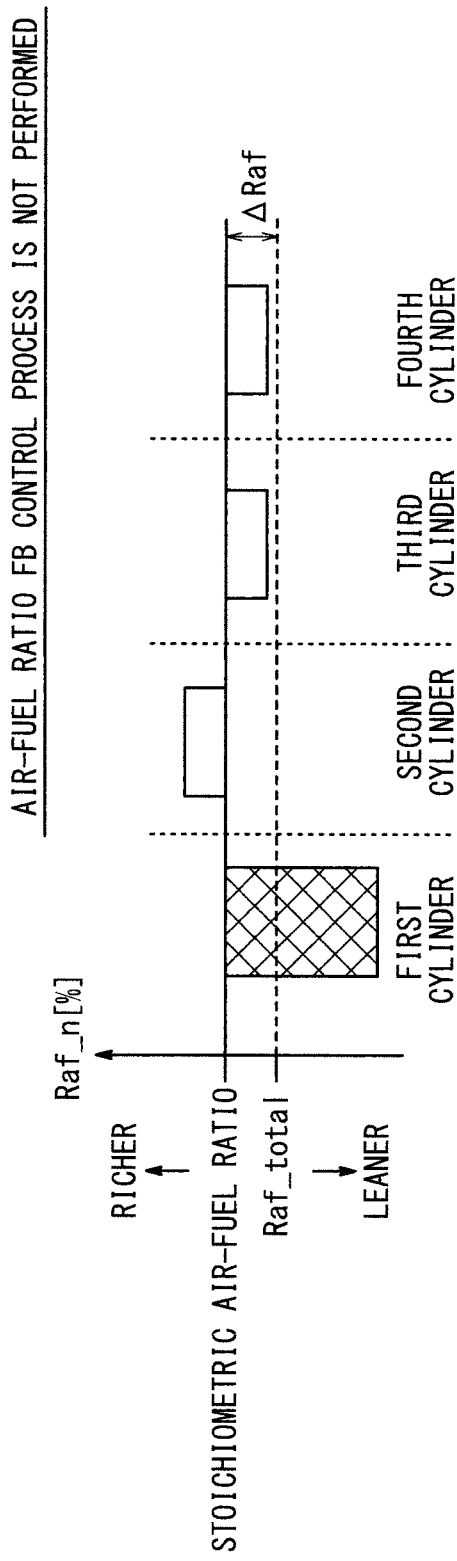
FIG. 19 is a diagram showing by way of example respective air-fuel ratios in cylinders which are achieved when only a basic fuel injection control process is used.
Figure 20:
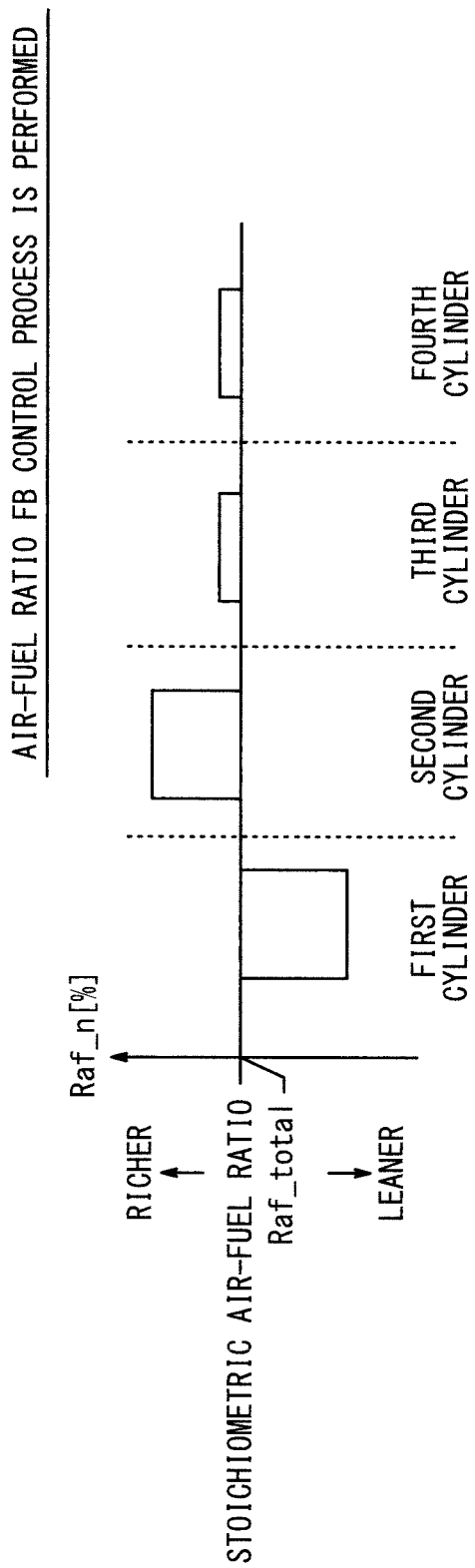
FIG. 20 is a diagram showing by way of example respective air-fuel ratios in cylinders which are achieved when a basic fuel injection control process and an air-fuel ratio feedback control process are used.

Specifically, while the engine 16 is in normal operation, both the basic fuel injection control process and the air-fuel ratio FB control process are used in combination. If the engine 16 has four cylinders 32 and one of them, e.g., the first cylinder 32a, is suffering a lean fuel fault, i.e., is short of fuel, then the air-fuel ratios Raf_n of the other three cylinders 32, i.e., the second through fourth cylinders 32b through 32d, are adjusted to increase supplied fuel, and the air-fuel ratio Raf_n of the first cylinder 32a is adjusted to reduce supplied fuel by the air-fuel ratio FB control process, thereby bringing the total air-fuel ratio Raf_total of the engine 16 to a target air-fuel ratio. In this case, as shown in FIGS. 19 and 20, the lean fuel fault of the first cylinder 32a cannot be detected.

According to the present embodiment, when the engine 16 is diagnosed, the air-fuel ratio FB control process is canceled and only the basic fuel injection control process is carried out. Therefore, a malfunctioning cylinder can be identified highly accurately and easily. Even though the engine 16 to be inspected has the air-fuel ratio sensor 38 for detecting the total air-fuel ratio only, it is possible to identify a malfunctioning cylinder highly accurately and easily.

According to the present embodiment, the target air-fuel ratio comprises the stoichiometric air-fuel ratio. According to the basic fuel injection control process, the respective fuel injection ratios Rfi_n, i.e., the air-fuel ratios Raf_n, of the cylinders 32 are controlled in order to bring the air-fuel ratios Raf_n of the cylinders 32 to the stoichiometric air-fuel ratio. According to the air-fuel ratio FB control process, while the engine 16 is idling with no load imposed thereon, if the total air-fuel ratio Raf_total of the engine 16 deviates from the stoichiometric air-fuel ratio, then the same corrective value Pc is applied to the cylinders 32 to equalize the total air-fuel ratio Raf_total to the stoichiometric air-fuel ratio. Consequently, since the stoichiometric air-fuel ratio is used as a reference both when the engine 16 is in normal operation and when the engine 16 is diagnosed, a malfunctioning cylinder is identified with ease.

B. Modifications

The present invention is not limited to the above embodiment, but may adopt various arrangements based on the disclosure of the present description. For example, the present invention may adopt the following arrangements:

In the above embodiment, the diagnosing apparatus is used to diagnose the engine 16 of the vehicle 12. However, the diagnosing apparatus 14 may be used to diagnose other apparatus having an internal combustion engine, e.g., mobile bodies such as ships or the like. In the above embodiment, the diagnosing apparatus 14 communicates with the engine ECU 20 from outside the vehicle 12. However, the diagnosing apparatus 14 may be installed inside the vehicle 12. Stated otherwise, the engine ECU 20 may have the function of the diagnosing apparatus 14.

In the above embodiment, the engine 16 comprises an in-line four-cylinder engine. However, the layout and number of the cylinders 32 are not limited to those illustrated. The engine 16 may comprise a V-shaped six-cylinder engine.

In the above embodiment, the engine 16 has the single air-fuel ratio sensor 38. However, the engine 16 may have a plurality of air-fuel ratio sensors 38 associated with the respective cylinders 32.

In the above embodiment, the processor 84 of the diagnosing apparatus 14 switches the cylinder air-fuel ratios Raf_n (the fuel injection ratios Rfi_n and the corrective values Cfi_n) through the engine ECU 20. However, the processor 84 may directly control the fuel injection valves 34 to switch the cylinder air-fuel ratios Raf_n (the fuel injection ratios Rfi_n and the corrective values Cfi_n). Alternatively, the engine ECU 20 may have the function of the diagnosing apparatus 14, so that the engine ECU 20 (the diagnosing apparatus 14) can directly control the fuel injection valves 34 to switch the cylinder air-fuel ratios Raf_n (the fuel injection ratios Rfi_n and the corrective values Cfi_n).

In the above embodiment, the accumulated value Tmf_total_n representing the number of misfires after the engine 16 has started to operate is determined for each cylinder 32. However, the accumulated value Tmf_total_n representing the number of misfires of the entire engine 16 after the engine 16 has started to operate may be determined and utilized.

In the above embodiment, the accumulated value Tmf_total_n is used for an accumulated value which represents the number of misfires after the engine 16 has started to operate. However, an accumulated value which represents the number of misfires from another time, e.g., upon elapse of a given time after the engine 16 has started to operate, may be used.

In the above embodiment, both the basic fuel injection control process and the air-fuel ratio FB control process are simultaneously carried out before the air-fuel ratio FB control process is discontinued in steps S33, S44. However, only the basic fuel injection control process may be used initially, and thereafter only the air-fuel ratio FB control process may be used. In this case, the basic fuel injection control process is resumed when the air-fuel ratio FB control process is discontinued in steps S33, S44. Alternatively, before the air-fuel ratio FB control process is discontinued in steps S33, S44, both the basic fuel injection control process and the air-fuel ratio FB control process may simultaneously be started, and thereafter the basic fuel injection control process may be discontinued and only the air-fuel ratio FB control process may continue. In this case, too, the basic fuel injection control process is resumed when the air-fuel ratio FB control process is discontinued in steps S33, S44.

Figure 21:
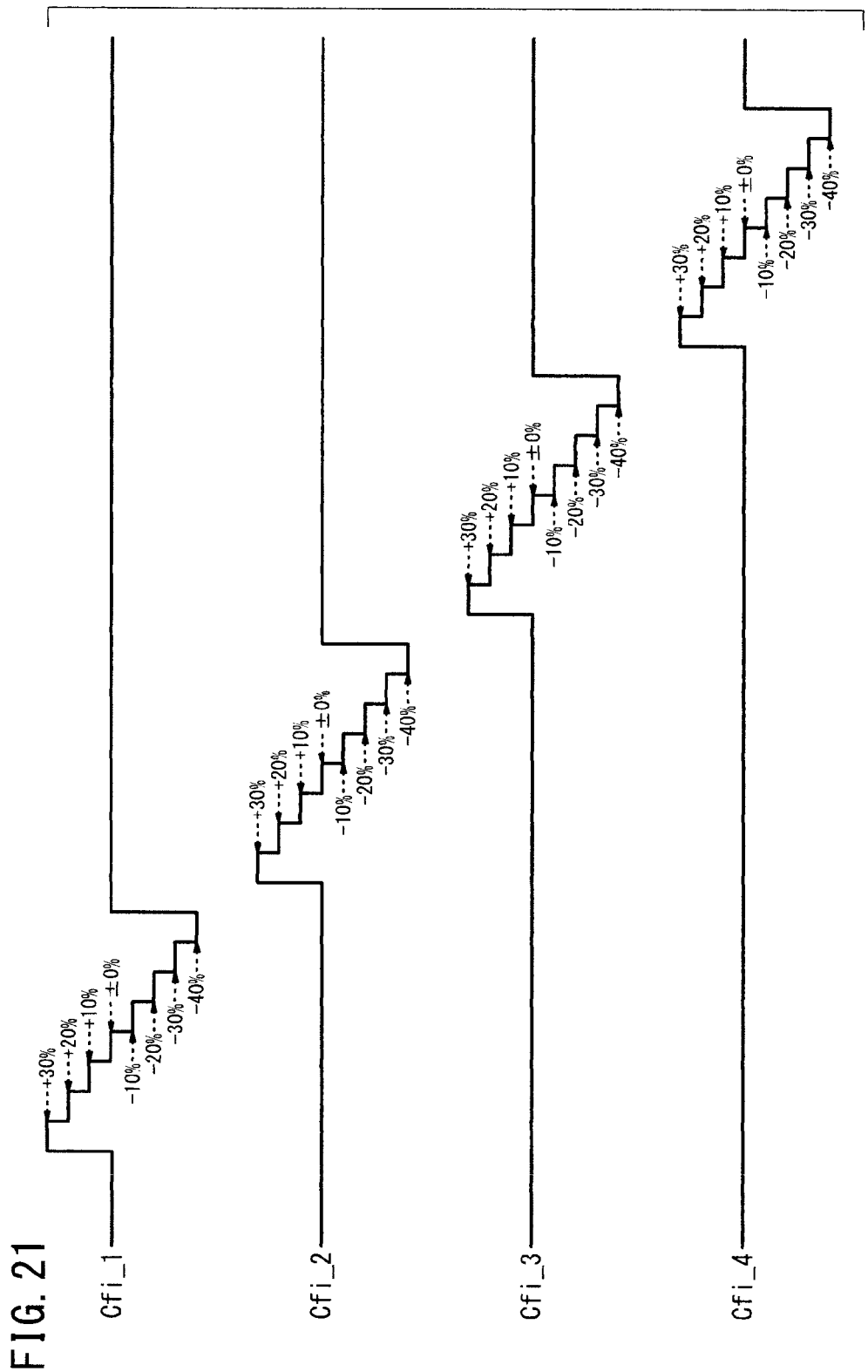
FIG. 21 is a diagram showing a first modification of the manner in which corrective quantities for the proportion of a target fuel injection quantity to a basic fuel injection quantity are switched in the second diagnostic process.
Figure 22:
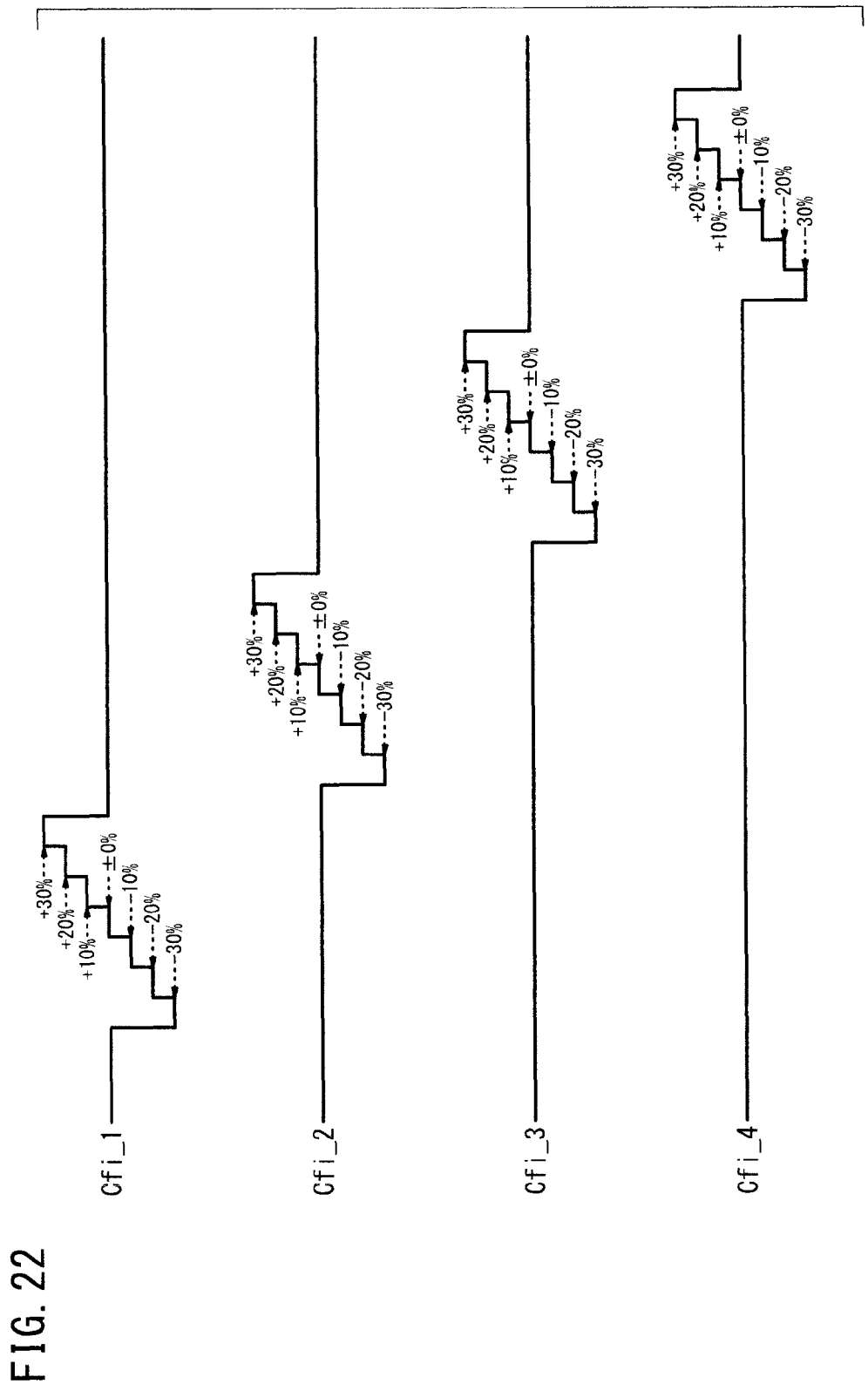
FIG. 22 is a diagram showing a second modification of the manner in which the corrective quantities are switched in the second diagnostic process.

In the second diagnostic process according to the above embodiment, the corrective value $Cfi\_n$ is reduced to reduce the air-fuel ratio $Raf\_n$ of each cylinder 32 from the stoichiometric air-fuel ratio to a leaner air-fuel ratio. However, as shown in FIG. 21, the corrective value $Cfi\_n$ may be switched stepwise from positive values to negative values to switch the air-fuel ratio $Raf\_n$ stepwise from richer air-fuel ratios to leaner air-fuel ratios. Alternatively, as shown in FIG. 22, the corrective value $Cfi\_n$ may be switched stepwise from negative values to positive values to switch the air-fuel ratio $Raf\_n$ stepwise from leaner air-fuel ratios to richer air-fuel ratios. In these cases, the corrective value $Cfi\_n$ may not be only a combination of ±0%, −10%, −20%, −30%, and −40%, but may be changed appropriately therefrom.

In the second diagnostic process according to the above embodiment, while the basic fuel injection control process is being performed on those cylinders 32 other than the target cylinder, the air-fuel ratio $Raf\_n$ (the corrective value $Cfi\_n$) of the target cylinder is gradually changed. However, the basic fuel injection control process for those cylinders 32 other than the target cylinder may be canceled to interrupt the fuel injection and ignition in those cylinders 32.

In the second diagnostic process according to the above embodiment, a malfunction is identified according to the flowchart shown in FIG. 13. However, the malfunction identifying process is not limited to the process shown in FIG. 13. In step S71, for example, a rich fuel fault is judged based on the accumulated value $Tmf\_cyl\_n$ at the time the fuel injection ratio $Rfi\_n$ is 70%, i.e., the corrective value $Cfi\_n$ is −30%. However, for judging a rich fuel fault, the fuel injection ratio $Rfi\_n$ may be of another value (see FIG. 14) insofar as it is smaller than a lean combustion limit value, i.e., a critical value for not causing a misfire, which is determined depending on the characteristics of the engine 16, for example. In this case, the threshold value (first threshold value) for the accumulated value $Tmf\_cyl\_n$ may be a positive value other than zero.

In step S73, a lean fuel fault is judged based on the accumulated value $Tmf\_cyl\_n$ at the time the fuel injection ratio $Rfi\_n$ is 90%, i.e., the corrective value $Cfi\_n$ is −10%. However, for judging a lean fuel fault, the fuel injection ratio $Rfi\_n$ may be of 100% or another value (see FIG. 14) insofar as it falls within a combustible range, i.e., a range for not causing a misfire, which is determined depending on the characteristics of the engine 16, for example. In this case, the threshold value TH_lean (second threshold value) may be set to an appropriate value.

In order to increase the accuracy of the diagnosis of the target cylinder for a malfunction in case another cylinder 32 than the target cylinder is malfunctioning, other steps may be added to the flowchart shown in FIG. 13. For example, before the target cylinder is judged as suffering a lean fuel fault in step S74 shown in FIG. 13, a change in the accumulated value $Tmf\_cyl\_n$ (i.e., the difference between the accumulated value $Tmf\_cyl\_n$ at the time the air-fuel ratio $Raf\_n$ of the target cylinder is 90% and the accumulated value $Tmf\_cyl\_n$ at the time the air-fuel ratio $Raf\_n$ of the target cylinder is 100%) is calculated when the air-fuel ratio $Raf\_n$ of the target cylinder is changed through a range (see FIG. 14) in which the accumulated value $Tmf\_cyl\_n$ representing the number of misfires is to change in the event of a lean fuel fault. If the calculated change is equal to or greater than a predetermined value, then the target cylinder may be judged as suffering a lean fuel fault.

The invention claimed is:

1. An internal combustion engine diagnosing apparatus for identifying a malfunctioning cylinder having an abnormal air-fuel ratio as a failure occurrence among a plurality of cylinders of a multicylinder internal combustion engine while the internal combustion engine is in operation, comprising:

an air-fuel ratio controller for controlling the respective cylinders such that a value of an air-fuel ratio of one of the cylinders in stable operation is changed to increase or decrease sequentially stepwise with one cylinder at a time in order, by controlling a fuel injection quantity adjusting unit for adjusting respective fuel injection quantities of the cylinders, the value of the air-fuel ratio to be changed to increase or decrease sequentially stepwise is predetermined in a program; and a malfunctioning cylinder identifier for identifying the malfunctioning cylinder based on a relationship between the respective numbers of misfires of the respective cylinders which are counted by a misfire counter with respect to each of the values of the air-fuel ratios which are changed stepwise, and the air-fuel ratios which are changed stepwise.

2. The internal combustion engine diagnosing apparatus according to claim 1, wherein the air-fuel ratio controller controls the fuel injection quantity adjusting unit to adjust the fuel injection quantities of the cylinders successively one by one, thereby to increase or reduce the air-fuel ratios stepwise, while no load is being imposed on the internal combustion engine.

3. The internal combustion engine diagnosing apparatus according to claim 1, wherein the air-fuel ratio controller reduces the fuel injection quantities stepwise, starting from a preset value for achieving a stoichiometric air-fuel ratio.

4. The internal combustion engine diagnosing apparatus according to claim 3, wherein when the fuel injection quantities are lower than a lean combustion limit value, which is determined depending on characteristics of the internal combustion engine, if there is a cylinder whose number of misfires is smaller than a first threshold value, the malfunctioning cylinder identifier judges the cylinder as suffering a rich fuel fault in which the cylinder is being supplied with excessive fuel.

5. The internal combustion engine diagnosing apparatus according to claim 3, wherein when the fuel injection quantities represent a preset value for achieving the stoichiometric air-fuel ratio or a predetermined value within a combustible range determined depending on characteristics of the internal combustion engine, if there is a cylinder whose number of misfires is larger than a second threshold value, the malfunctioning cylinder identifier judges the cylinder as suffering a lean fuel fault in which the cylinder is being short of fuel.

6. The internal combustion engine diagnosing apparatus according to claim 1, further comprising:
a protector for stopping changing the air-fuel ratios stepwise to protect an ignition plug or an exhaust gas purification filter if the number of misfires of either one of the cylinders or the total of the numbers of misfires of the cylinders exceeds a predetermined value while the air-fuel ratios which are being changed stepwise.

7. The internal combustion engine diagnosing apparatus according to claim 1, wherein if the internal combustion engine has a total air-fuel ratio deviating from a target air-fuel ratio, an air-fuel ratio feedback control process can be carried out for applying the same corrective value to each of the cylinders to equalize the total air-fuel ratio of the internal combustion engine to the target air-fuel ratio;
when the internal combustion engine is diagnosed, at least the air-fuel ratio feedback control process is carried out on each of the cylinders and each of the cylinders is monitored for a misfire while the internal combustion engine is idling after being warmed up;
when the misfire occurs, the air-fuel ratio feedback control process is discontinued and a basic fuel injection control process is started or continued to judge whether the misfire continues or not;
if the misfire continues even during the basic fuel injection control process, it is judged whether the corrective value exceeds a first threshold value to judge a rich fuel fault in which each of the cylinders is being supplied with excessive fuel or a second threshold value to judge a lean fuel fault in which each of the cylinders is being short of fuel; and
if the corrective value exceeds the first threshold value, it is decided that one of the cylinders which causes a misfire at the time is suffering the rich fuel fault, or if the corrective value exceeds the second threshold value, it is decided that one of the cylinders which causes a misfire at the time is suffering the lean fuel fault.

8. An internal combustion engine diagnosing method for identifying a malfunctioning cylinder having an abnormal air-fuel ratio as a failure occurrence among a plurality of cylinders of a multicylinder internal combustion engine while the internal combustion engine is in operation, comprising the steps of:
changing air-fuel ratios of the respective cylinders stepwise such that a value of an air-fuel ratio of one of the cylinders in stable operation is changed to increase or decrease sequentially stepwise with one cylinder at a time in order, by controlling respective fuel injection quantities of the cylinders, the value of the air-fuel ratio to be changed to increase or decrease sequentially stepwise is predetermined in a program;
counting the respective numbers of misfires of the respective cylinders with respect to each of the values of the air-fuel ratios which are changed stepwise; and
identifying the malfunctioning cylinder based on a relationship between the values of the air-fuel ratios which are changed stepwise and the numbers of misfires of the cylinders.

9. The internal combustion engine diagnosing method according to claim 8, wherein the step of changing the air-fuel ratios comprises controlling the fuel injection quantities of the cylinders successively one by one thereby to increase or reduce the air-fuel ratios stepwise, while no load is being imposed on the internal combustion engine.

10. The internal combustion engine diagnosing method according to claim 8, wherein the step of changing the air-fuel ratios comprises reducing the fuel injection quantities stepwise, starting from a preset value for achieving a stoichiometric air-fuel ratio.

11. The internal combustion engine diagnosing method according to claim 10, wherein the step of identifying the malfunctioning cylinder comprises, when the fuel injection quantities are lower than a lean combustion limit value, which is determined depending on characteristics of the internal combustion engine, if there is a cylinder whose number of misfires is smaller than a first threshold value, judging the cylinder as suffering a rich fuel fault in which the cylinder is being supplied with excessive fuel.

12. The internal combustion engine diagnosing method according to claim 10, wherein the step of identifying the malfunctioning cylinder comprises, when the fuel injection quantities represent a preset value for achieving the stoichiometric air-fuel ratio or a predetermined value within a combustible range determined depending on the characteristics of the internal combustion engine, if there is a cylinder whose number of misfires is larger than a second threshold value, judging the cylinder as suffering a lean fuel fault in which the cylinder is being short of fuel.

13. The internal combustion engine diagnosing method according to claim 8, further comprising the step of:
stopping changing the air-fuel ratios stepwise to protect an ignition plug or an exhaust gas purification filter if the number of misfires of either one of the cylinders or total of the numbers of misfires of the cylinders exceeds a predetermined value while the air-fuel ratios which are being changed stepwise.

14. The internal combustion engine diagnosing method according to claim 8, further comprising the steps of:
carrying out basic fuel injection control to control the respective air-fuel ratios of the cylinders by adjusting the respective fuel injection quantities of the cylinders;
counting the numbers of misfires of the respective cylinders; and
identifying the malfunctioning cylinder;
wherein the step of carrying out basic fuel injection control comprises:
carrying out a basic fuel injection control process for controlling the respective air-fuel ratios of the cylinders to equalize the air-fuel ratios of the cylinders to a target value of the total internal combustion engine; and
carrying out an air-fuel ratio feedback control process for, if the internal combustion engine has a total air-fuel ratio deviating from a target air-fuel ratio, applying the same corrective value to each of the cylinders to equalize the total air-fuel ratio of the internal combustion engine to the target air-fuel ratio;
the step of carrying out the basic fuel injection control process comprises, when the internal combustion engine is diagnosed, carrying out at least the air-fuel ratio feedback control process on each of the cylinders and monitoring each of the cylinders for a misfire while the internal combustion engine is idling after being warmed up;

when the misfire occurs, discontinuing the air-fuel ratio feedback control process and starting or continuing the basic fuel injection control process to judge whether the misfire continues or not;

if the misfire continues even during the basic fuel injection control process, judging whether the corrective value exceeds a first threshold value to judge a rich fuel fault in which each of the cylinders is being supplied with excessive fuel or a second threshold value to judge a lean fuel fault in which each of the cylinders is being short of fuel; and if the corrective value exceeds the first threshold value, deciding that one of the cylinders which causes a misfire at the time is suffering the rich fuel fault, or if the corrective value exceeds the second threshold value, deciding that one of the cylinders which causes a misfire at the time is suffering the lean fuel fault.

* * * * *